(12) United States Patent
    Sarver

(10) Patent No.: US 12,415,454 B2
(45) Date of Patent: Sep. 16, 2025

(54) METHOD AND APPARATUS FOR SECURING AT LEAST ONE OBJECT WITH A VEHICLE

(71) Applicant: Adam R. Sarver, Mars, PA (US)

(72) Inventor: Adam R. Sarver, Mars, PA (US)

( * ) Notice: Subject to any disclaimer, the term of this patent is extended or adjusted under 35 U.S.C. 154(b) by 695 days.

(21) Appl. No.: 17/829,846

(22) Filed: Jun. 1, 2022

(65) Prior Publication Data

US 2023/0391247 A1    Dec. 7, 2023

(51) Int. Cl.
 B60P 7/08 (2006.01)
 B60P 7/12 (2006.01)

(52) U.S. Cl.
 CPC ........... B60P 7/0876 (2013.01); B60P 7/0823 (2013.01); B60P 7/12 (2013.01)

(58) Field of Classification Search
 CPC ......... B60P 7/0876; B60P 7/0823; B60P 7/12; B60P 7/08; B60P 7/135; B60P 7/0846; B60P 7/065; B60P 7/06; B60P 7/02; B60P 7/00; B60P 3/40; B65D 85/67
 USPC ......... 410/97, 96, 100, 101, 103, 34, 36, 42, 410/117, 118; 206/443, 592; 24/712, 24/713, 713.3, 713.6, 713.4; 224/403, 224/534, 338; 138/96 R
 See application file for complete search history.

(56) References Cited

U.S. PATENT DOCUMENTS

| | | | |
|---|---|---|---|
| 5,452,973 A * | 9/1995 | Arvin | B61D 45/00 410/117 |
| 5,458,447 A | 10/1995 | Clason | |
| 5,876,167 A | 3/1999 | Selby | |
| 6,626,620 B1 * | 9/2003 | Veal | B60P 7/06 410/97 |
| 6,783,311 B2 | 8/2004 | Sauerwald | |
| 7,217,074 B1 | 5/2007 | Huber | |
| 7,837,421 B1 * | 11/2010 | Rowe | B60P 3/40 410/97 |
| 8,146,786 B2 | 4/2012 | Cheung et al. | |
| 8,292,559 B1 | 10/2012 | Foggy | |
| 8,740,525 B2 | 6/2014 | Coury et al. | |
| 8,882,417 B2 | 11/2014 | Sauerwald | |
| 9,566,893 B2 | 2/2017 | Blohm | |
| 10,131,384 B2 | 11/2018 | Raines et al. | |
| 10,457,192 B1 | 10/2019 | Heimstra | |
| 10,682,945 B2 | 6/2020 | Riedel et al. | |

(Continued)

FOREIGN PATENT DOCUMENTS

CA         2274348 C  *  9/2007  ............ B60P 7/0823

*Primary Examiner* — Amy R Weisberg
(74) *Attorney, Agent, or Firm* — Sand, Sebolt & Wernow Co., LPA

(57) ABSTRACT

A cargo restraint and apparatus and a method thereof for securing at least one object with a vehicle. The cargo restraint apparatus includes a hood that has an open end, a closed end extending from the open end, and a chamber collectively defined between the open end and the closed end. The hood is adapted to encapsulate and support an end of at least one object, via the chamber, outside of a vehicle. The cargo restraint apparatus also includes an attachment strap that is operably connected with the hood and is configured to restrain the at least one object inside of the vehicle. The cargo restraint apparatus also includes at least one anchoring assembly operably connected with one of the hood and the attachment strap. The at least one anchoring assembly is adapted to secure the hood and the at least one object with the vehicle.

20 Claims, 9 Drawing Sheets

(56) References Cited

U.S. PATENT DOCUMENTS

| | | | |
|---|---|---|---|
| 2002/0098052 A1* | 7/2002 | Liu | B60P 7/0815 |
| | | | 410/97 |
| 2004/0076487 A1* | 4/2004 | Sauerwald | B60P 7/0823 |
| | | | 410/97 |
| 2005/0180835 A1 | 8/2005 | Schneider | |
| 2010/0290856 A1* | 11/2010 | Zahorec | B60R 7/005 |
| | | | 410/118 |
| 2011/0211930 A1* | 9/2011 | Digman | B60P 7/0815 |
| | | | 410/115 |
| 2023/0339385 A1* | 10/2023 | Raver | B60P 7/0876 |

\* cited by examiner

METHOD AND APPARATUS FOR SECURING AT LEAST ONE OBJECT WITH A VEHICLE

TECHNICAL FIELD

This disclosure is generally directed to securing at least one object with a vehicle for transport. More particularly, this disclosure is directed to a cargo restraint apparatus for securing at least one object at two positions longitudinally opposite to one another with a vehicle for transport. Specifically, the disclosure is directed to a cargo restraint apparatus for enveloping and releasably securing a first end of at least one object at a first position inside of a vehicle and enveloping and releasably securing a second end of the at least one object at a second position outside of the vehicle longitudinally opposite to the first position relative to a longitudinal direction of the vehicle.

BACKGROUND

Devices and assemblies for restraining and securing objects with a vehicle for transport are fairly well known and used. For example, various ropes, straps, cords, cargo nets, ratchet straps, storage racks, and other devices of the like are commonly used for securing and restraining cargo and objects within a vehicle. Generally, these types of devices are suitable for normal securing situations where the objects are sized and configured to remain within the bounds of the vehicle.

However, in some instances, these objects may be large and cumbersome and protrude outwardly and rearwardly from the vehicle due to the sheer sizes, shapes, or configurations of these objects being larger than cargo space or bed of said vehicle. Generally, the typical securement devices used in securing these types of large and cumbersome objects with a vehicle pose numerous risks when transporting these objects. Specifically, such use of typical securement devices poses risks of the objects shifting or becoming loose during transporting, physical damages to the objects due to movement or shifting, traffic risks of the objects falling from the vehicle, and other various risks of the like when using available securement devices for securing large and cumbersome objects with a vehicle.

To combat these issues, devices and apparatuses have been manufactured to relieve some risks of transporting large and cumbersome objects with a vehicle that protrudes from the vehicle. However, these devices and apparatuses, generally, only restrain and/or secure objects at a single point or end while needing to utilize an opposing structure or member of the vehicle to secure the opposing side of the objects with the vehicle. Such lack of securement points with long and cumbersome objects may lead to the objects becoming loose and eventually move inside of the vehicle due to normal vibrations and driving conditions experienced by the vehicle and the objects. More so, these conventional devices and apparatuses generally require users to provide additional components and elements to be used simultaneously with these devices and apparatuses for preventing objects from shifting and/or moving while in transit. As such, users of these types of devices and apparatuses must carry and/or have additional components and elements to use with these devices and apparatuses which could add time and labor in securing such long and cumbersome objects with a vehicle.

SUMMARY

The presently disclosed cargo restraint apparatus provides users with the capability of securing and restraining at least one object at a first position inside of a vehicle and at a second position outside of the vehicle due to the length of the at least one object being larger than the length of a cargo area of the vehicle. The cargo restraint apparatus enables a user to selectively secure a first end of the at least one object inside of the vehicle with a securing mechanism, via an attachment strap of the cargo restraint apparatus, at preconfigured attachment points. The cargo restraint apparatus also enables a user to envelop and secure a second end of the at least one object outside of the vehicle that is longitudinally opposite to the first end of the at least one object. Such restraint at two positions of the at least one object prevents the at least one object from sliding or shifting when in transit with the vehicle. As such, the cargo restraint apparatus disclosed herein addresses some of the inadequacies of previously known cargo securement or restraint apparatuses.

In one aspect, an exemplary embodiment of the present disclosure may provide a cargo restraint apparatus. The cargo restraint apparatus includes a hood having an open end, a closed end extending from the open end, and a chamber collectively defined between the open end and the closed end, wherein the hood is adapted to encapsulate and support an end of at least one object, via the chamber, outside of a vehicle. The cargo restraint apparatus also includes an attachment strap operably connected with the hood and configured to restrain the at least one object inside of the vehicle. The cargo restraint apparatus also includes at least one anchoring assembly operably connected with one of the hood and the attachment strap, wherein the at least one anchoring assembly is adapted to secure the hood and the at least one object with the vehicle.

This exemplary embodiment or another exemplary embodiment may further include that the hood is made from a flexible material that enables the hood to be foldable for storage purposes. This exemplary embodiment or another exemplary embodiment may further include that the hood is made from a flexible material that enables the hood to be rollable for storage purposes. This exemplary embodiment or another exemplary embodiment may further include a first end of the attachment strap remote from the hood; a second end of the attachment strap operably engaged with the hood and opposite to the first end; and a plurality of attachment points discretely positioned along the attachment strap between the first end and the second end; wherein each attachment point of the plurality of attachment points enables a securing mechanism to be selectively operably engaged with the attachment strap and operably engaged with at least one tie down anchor of the vehicle. This exemplary embodiment or another exemplary embodiment may further include a draw-cord mechanism operably engaged with the hood proximate to the front end of the hood; wherein the draw-cord mechanism in configured to selectively set a diameter of the open end of the hood to access to the chamber and to cinch the at least one object with the hood. This exemplary embodiment or another exemplary embodiment may further include at least one pocket defined in the hood separate from the chamber; wherein the at least one pocket is configured to house at least one of the attachment strap and the draw-cord mechanism when the cargo restraint apparatus is not being used. This exemplary embodiment or another exemplary embodiment may further include that the at least one pocket further comprises: a first pocket defined in the hood that is separate from the chamber; wherein the first pocket is configured to house the entire attachment strap when the cargo restraint apparatus is provided in a stored position. This exemplary embodiment or another exemplary embodiment may further include that the at least one pocket further comprises: a second pocket defined in the hood that is separate from the chamber and the first pocket and is transversely opposite to the first pocket; wherein the second pocket is configured to house the draw-cord mechanism when the cargo restraint apparatus is provided in the stored position. This exemplary embodiment or another exemplary embodiment may further include a passageway defined in the hood at the front end of said hood that is separate from the chamber; wherein the passageway is configured to house the draw-cord mechanism and enable to the draw-cord mechanism and the hood to operably engaged with one another. This exemplary embodiment or another exemplary embodiment may further include at least one mesh component operably engaged with the hood at the rear end; wherein the at least one mesh component is configured to enable air to flow through the hood and to prevent said air from being trapped inside of the hood. This exemplary embodiment or another exemplary embodiment may further include that the at least one anchoring assembly further comprises: a first anchoring assembly operably connected with one of the hood and the attachment strap; and a second anchoring assembly operably connected with one of the hood and the attachment strap transversely opposite to the first anchoring assembly; wherein the first anchoring assembly is configured to operably engage a first tie-down anchor of the vehicle to secure the hood and the at least one object with the vehicle; and wherein the second anchoring assembly is configured to operably engage a second tie-down anchor of the vehicle transversely opposite to the first tie-down anchor to secure the hood and the at least one object with the vehicle. This exemplary embodiment or another exemplary embodiment may further include that wherein when a securing mechanism operably engages with the attachment strap, the securing mechanism operably engages with a third tie-down anchor and a fourth tie-down anchor of the vehicle longitudinally opposite to the first tie-down anchor and the second tie-die anchor to secure the attachment strap and the at least one object with the vehicle. This exemplary embodiment or another exemplary embodiment may further include a safety indicator operably engaged at the closed end of the hood to alert surrounding traffic that the at least one object is protruding from the vehicle.

In another aspect, an exemplary embodiment of the present disclosure may provide a method of securing at least one object with a vehicle. The method comprises steps of: loading the at least one object into the vehicle; encapsulating a first end of the at least one object via a hood of a cargo restraint apparatus outside of the vehicle; positioning an attachment strap of the cargo restraint apparatus with the at least one object inside of the vehicle; anchoring the hood and the first end of the at least one object with the vehicle, via at least one anchoring assembly of the cargo restraint apparatus, at a first position of the vehicle; anchoring the attachment strap and a second end of the at least one object with the vehicle, via a securing mechanism, at a second position of the vehicle opposite to the first position; and securing the at least one object with the vehicle.

This exemplary embodiment or another exemplary embodiment may further include a step of selectively attaching the securing mechanism with the attachment strap at preconfigured attachment points discretely positioned between a first end of the attachment strap and a second end of the attachment strap. This exemplary embodiment or another exemplary embodiment may further include a step of selectively attaching the securing mechanism with the attachment strap at at least one attachment point of a plurality of attachment points discretely positioned between a first end of the attachment strap and a second end of the attachment strap. This exemplary embodiment or another exemplary embodiment may further include that the step of anchoring the hood and the first end of the at least one object with the vehicle further includes: anchoring the hood and the first end of the at least one object with the vehicle, via a first anchoring assembly of the cargo restraint apparatus, at a first tie-down anchor of the vehicle at the first position of the vehicle; and anchoring the hood and the first end of the at least one object with the vehicle, via a second anchoring assembly of the cargo restraint apparatus, at a second tie-down anchor of the vehicle at the first position of the vehicle transversely opposite to the first tie-down. This exemplary embodiment or another exemplary embodiment may further include that the step of anchoring the attachment strap and the second end of the at least one object with the vehicle further includes that the securing mechanism operably engages with a third tie-down anchor of the vehicle longitudinally opposite to the first tie-down anchor for securing the attachment strap and the at least one object with the vehicle; and wherein the step of anchoring the attachment strap and the second end of the at least one object with the vehicle further includes that the securing mechanism operably engages with a fourth tie-down anchor of the vehicle longitudinally opposite to the second tie-down anchor for securing the attachment strap and the at least one object with the vehicle. This exemplary embodiment or another exemplary embodiment may further include a step of cinching the hood with the at least one object via a draw-cord mechanism of the cargo restraint apparatus. This exemplary embodiment or another exemplary embodiment may further include a step of storing the attachment strap, via a first pocket defined in the hood, when the cargo restraint apparatus is provided in a stored position. This exemplary embodiment or another exemplary embodiment may further include a step of storing a draw-cord mechanism of the cargo restraint apparatus, via a second pocket defined in the hood, when the cargo restraint apparatus is provided in a stored position; wherein the second pocket opposes the first pocket and is separate from the first pocket.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

FIGS. 1-4 illustrate a cargo restraint apparatus generally referred to as 1. As described in more detail below, the cargo restraint apparatus 1 is configured to restrain and/or secure at least one object with a vehicle when the vehicle is traveling with the at least one object.

Figure 1:
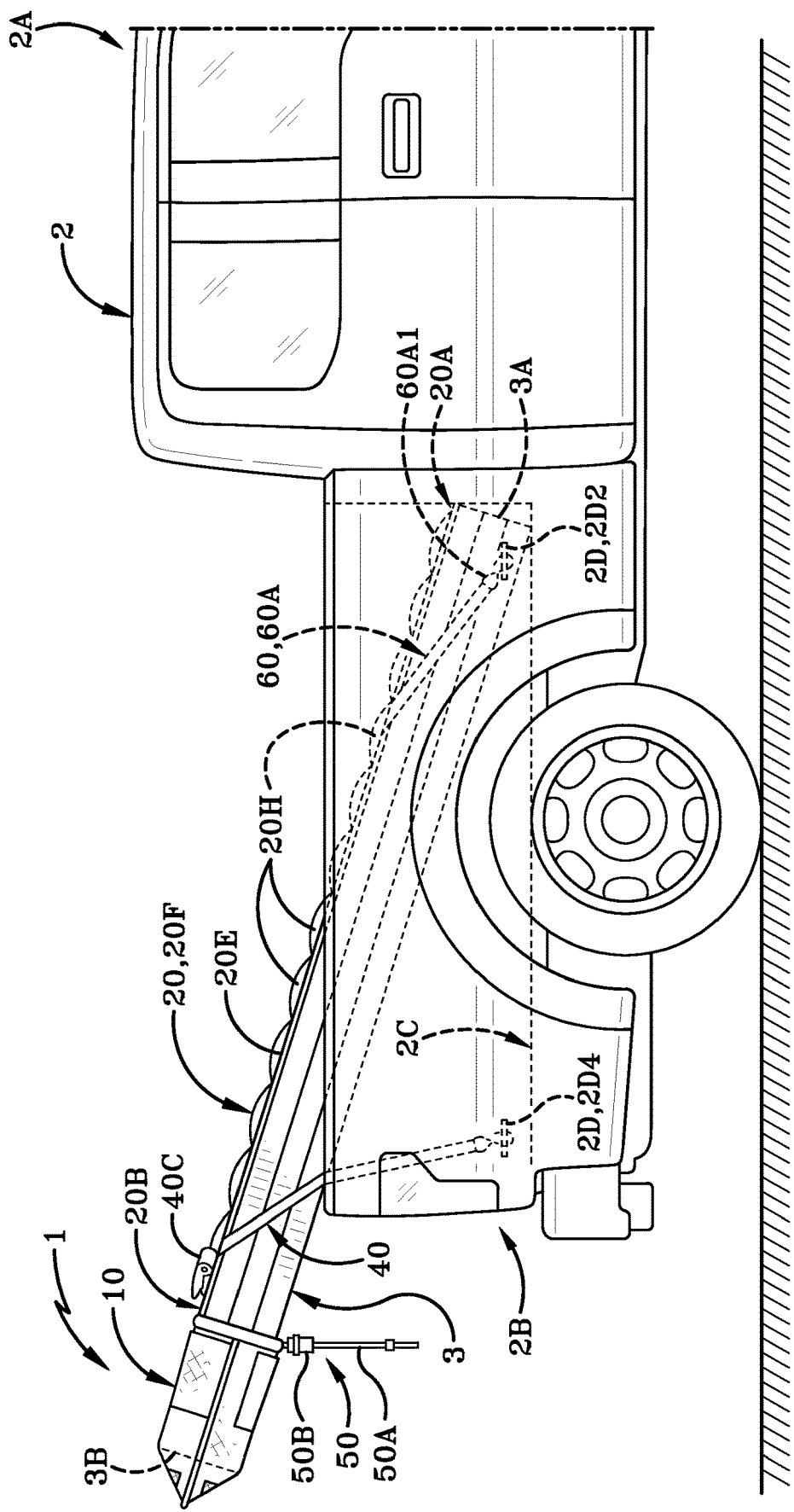
FIG. 1 is a first side elevation view of a cargo restraint apparatus in accordance with an aspect of the present disclosure, wherein the cargo restraint apparatus is securing at least one object with a vehicle.
Figure 4:
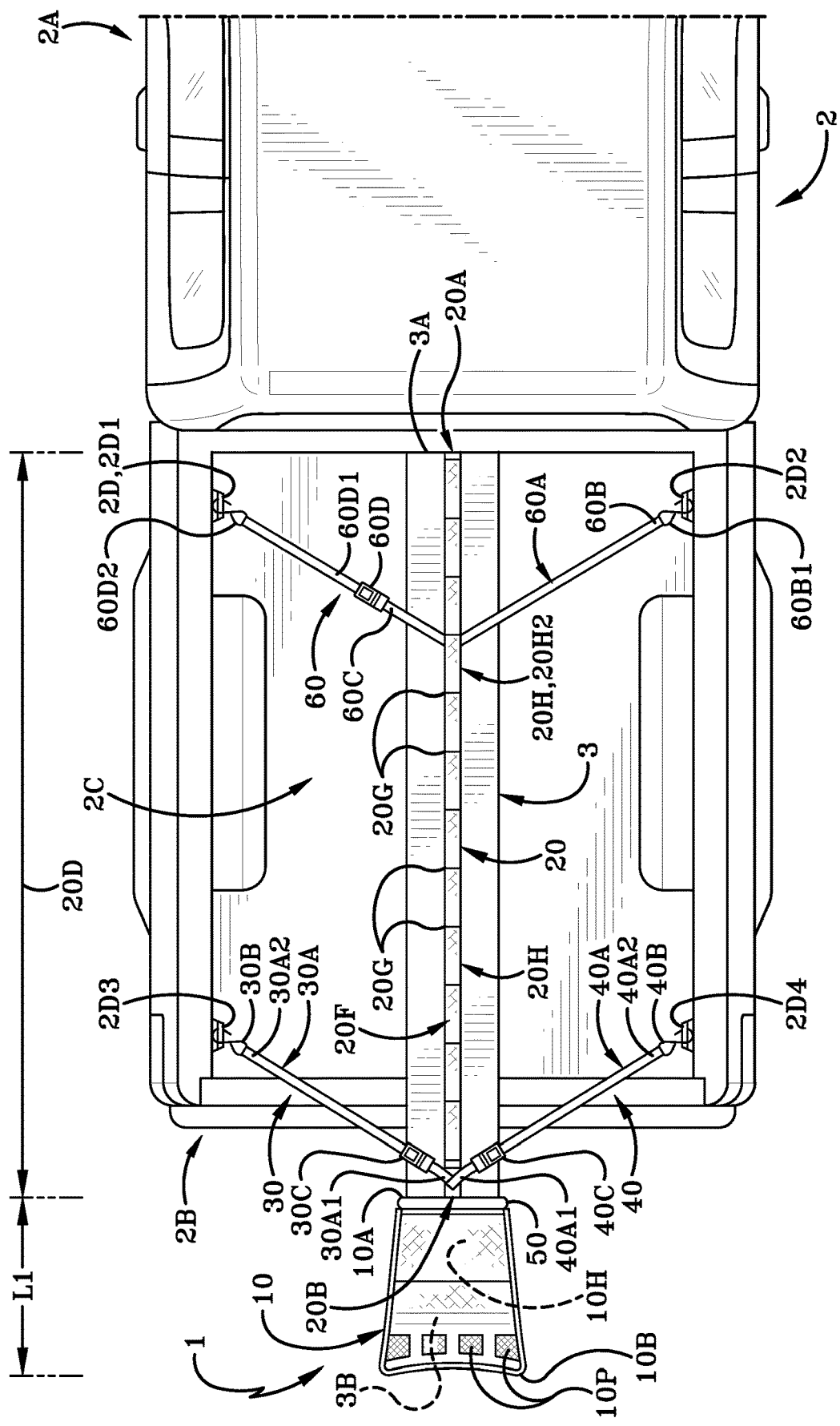
FIG. 4 is a top plan view of the cargo restraint apparatus, shown in FIG. 1, securing at least one object with the vehicle.

Referring to FIGS. 1 and 4, the cargo restraint apparatus 1 operably engages with a vehicle 2 to restrain and/or secure at least one object 3 with the vehicle 2 for safely transporting the at least one object 3, which is described in more detail below. As illustrated, the cargo restraint apparatus 1 is used with a pick-up truck that is suitable for carrying and supporting the at least one object 3. In other exemplary embodiments, any suitable vehicle may be used for carrying and supporting at least one object with assistance from a cargo restraint apparatus described and illustrated herein. Examples of suitable vehicles for carrying and supporting at least one object with assistance from a cargo restraint apparatus described and illustrated herein include sedans, hatchbacks, sport utility vehicles (SUVs), crossovers, vans, commercial trucks, aquatic vehicles, and other suitable vehicles for carrying and supporting at least one object with assistance from a cargo restraint apparatus described and illustrated.

Still referring to FIGS. 1 and 4, the vehicle 2 may include a front end 2A, a rear end 2B longitudinally opposite to the front end 2A, and a longitudinal direction defined therebetween in which the vehicle 2 drives forwardly and rearwardly. The vehicle 2 may also include a bed or storage area 2C that is disposed between the front end 2A and the rear end 2B proximate to the rear end 2B. The storage area 2C may be any suitable length that is commercially available for the vehicle 2 described and illustrated herein.

The vehicle 2 may also include at least one tie-down anchor 2D that is operably engaged with the vehicle 2 inside of the storage area 2C. As illustrated in FIG. 4, the vehicle 2 includes four tie-down anchors 2D1, 2D2, 2D3, 2D4 that are positioned inside of the storage area 2C. In other exemplary embodiments, any suitable number of tie-down anchors may be provided in a bed or cargo space of a vehicle used for hauling and transporting objects and cargo. In the illustrated embodiment, the first tie-down anchor 2D1 is positioned proximate to the front end 2A of the vehicle 2 inside of the storage area 2C. The second tie-down anchor 2D2 is positioned proximate to the front end 2A of the vehicle 2 inside of the storage area 2C and transversely opposite to the first tie-down anchor 2D1. The third tie-down anchor 2D3 is positioned proximate to the rear end 2B of the vehicle 2 inside of the storage area 2C and longitudinally opposite to the first tie-down anchor 2D1. The fourth tie-down anchor 2D4 is positioned proximate to the rear end 2B of the vehicle 2 inside of the storage area 2C and longitudinally opposite to the second tie-down anchor 2D2. As described in more detail below, the tie-downs anchors 2D1, 2D2, 2D3, 2D4 may be used as attachment points for restraining and securing the at least one object 3 with the vehicle 2 via the cargo restraint apparatus 1. In other exemplary embodiments, any tie-down anchors of a vehicle or other devices of the like may be operably engaged at any position of the vehicle for assisting in securing and restraining at least one object or cargo with a vehicle.

Referring to FIGS. 1 and 4, the at least one object 3 is loaded into the storage area 2C of the vehicle 2 and restrained and/or secured with the vehicle 2 via the cargo restraint apparatus 1. As illustrated, the at least one object 3 includes a first end 3A that is positioned inside of the storage area 2C of the vehicle 2 proximate to the front end 2A and is restrained by the cargo restraint apparatus 1 at a first position. The at least one object 3 also includes a second end 3B that is longitudinally opposite to the first end 3A; the second end 3B is positioned outside of the storage area 2C of the vehicle 2 past the rear end 2B of the vehicle 2 and is restrained by the cargo restraint apparatus 1 at a second position longitudinally opposite to the first position. In the illustrated embodiment, three pieces of lumber 3 each being rectangular cuboidal shape are restrained and secured with the vehicle 2 via the cargo restraint apparatus 1. In other exemplary embodiments, any suitable object or cargo may be restrained and supported with a vehicle by a cargo restraint apparatus described and illustrated herein where a portion of the object or cargo protrudes outside of the vehicle and needs support and/or assistance at that protruding point.

Figure 2:
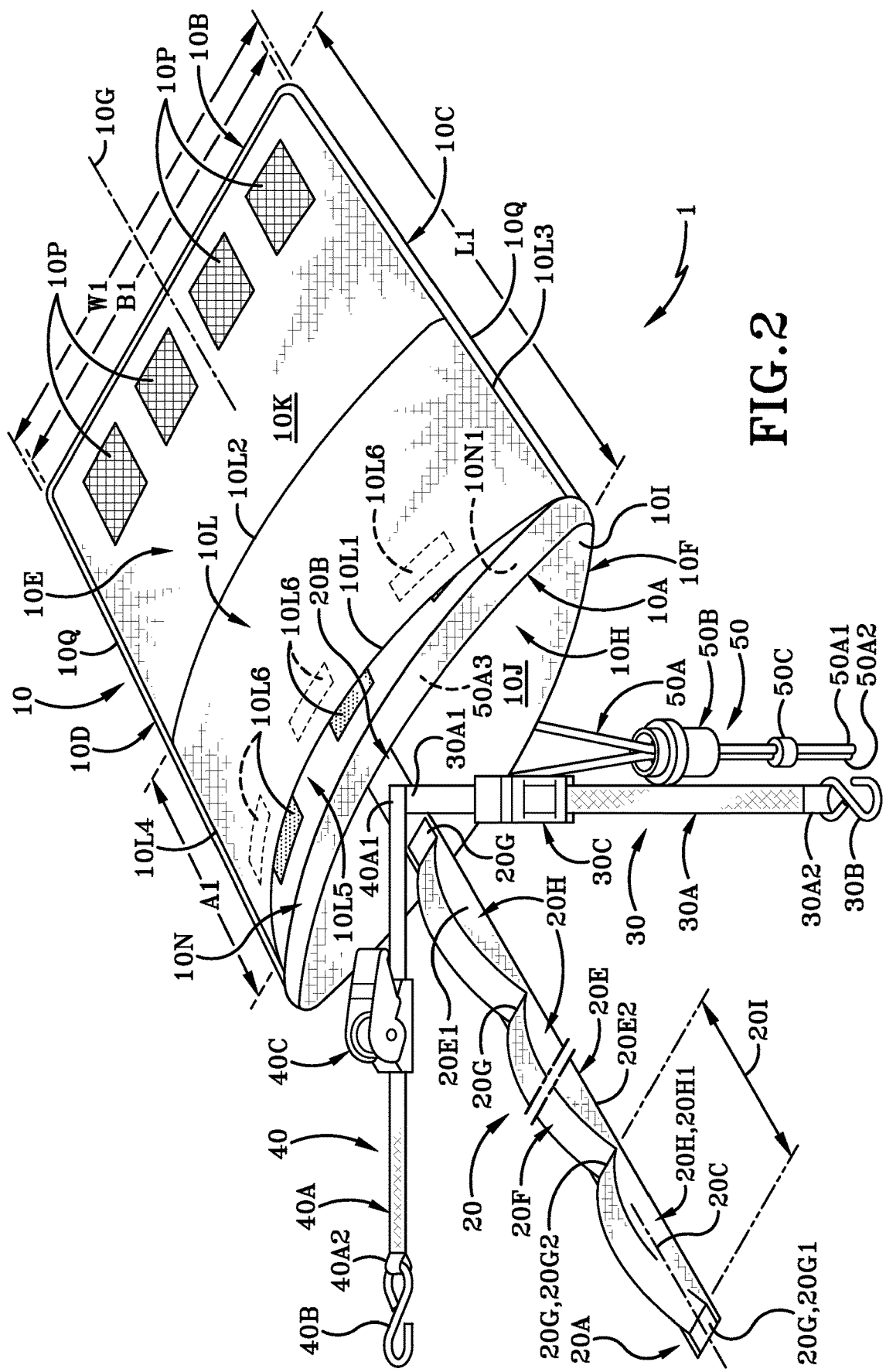
FIG. 2 is a top, front, first side isometric perspective view of the cargo restraint apparatus shown in FIG. 1.
Figure 3:
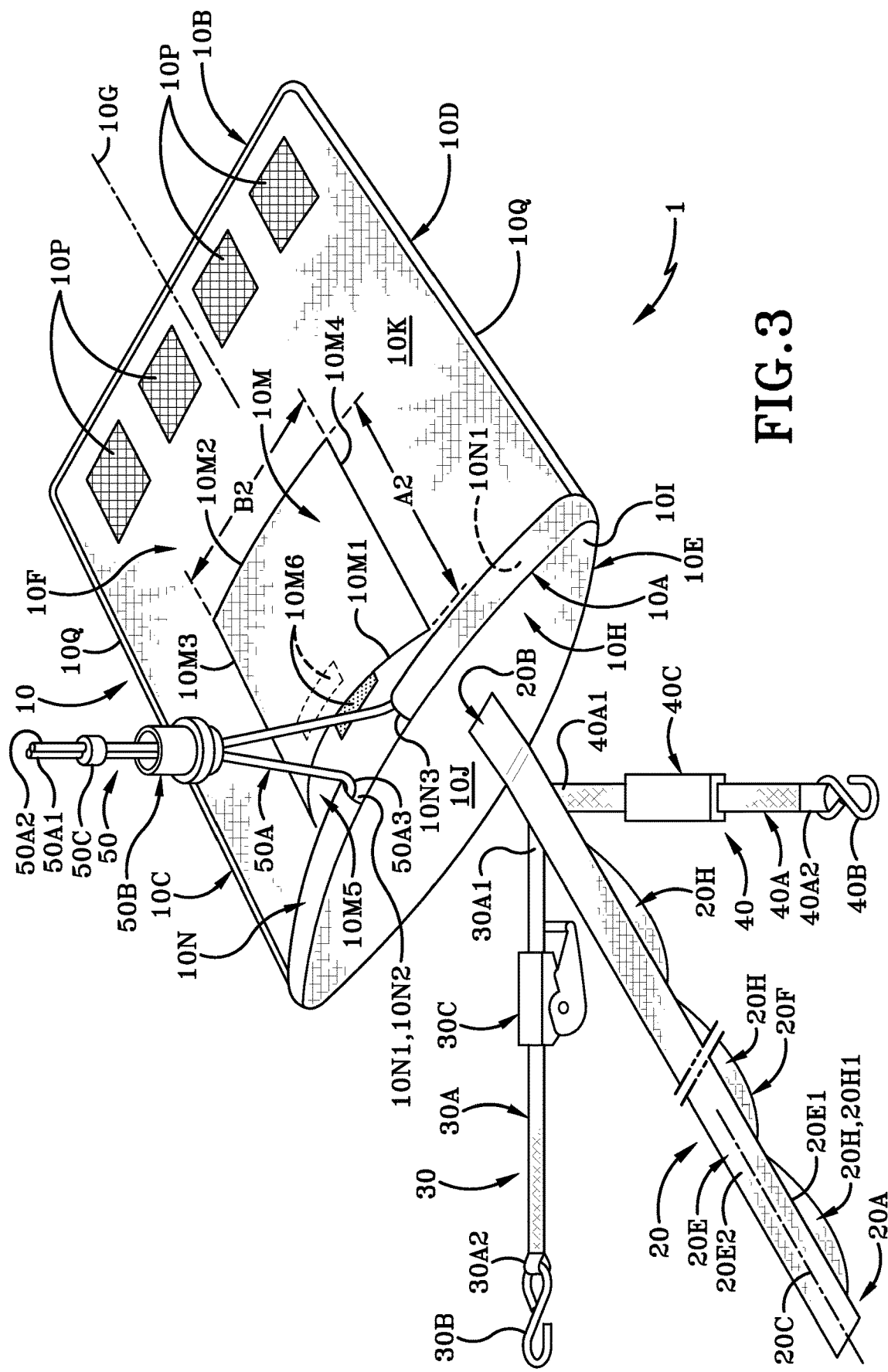
FIG. 3 is a bottom, front, second side isometric perspective view of the cargo restraint apparatus shown in FIG. 1.

Referring to FIGS. 2-3, the cargo restraint apparatus 1 includes a hood 10. In the illustrated embodiment, the hood 10 includes a first or front end 10A, a second or rear end 10B longitudinally opposite to the front end 10A, and a longitudinal direction defined therebetween for allowing at least one object into the hood 10, which is described in more detail below. The hood 10 also includes a first side 10C defined between the front end 10A and the rear end 10B, a second side 10D transversely opposite to the first side 10C and defined between the front end 10A and the rear end 10B, and a transverse axis defined therebetween. The hood 10 also includes a third or top end 10E defined between the front end 10A and the rear end 10B, a fourth or bottom end 10F vertically opposite to the top end 10E and defined between the front end 10A and the rear end 10B, and a vertical axis defined therebetween. In the illustrated embodiment, each of the front end 10A, the rear end 10B, the first side 10C, and the second side 10D are linear and/or straight edges that are orthogonal with one another. The hood 10 also includes a longitudinal axis 10G that extends between the front end 10A of the hood 10 and the rear end 10B of the hood 10; such reference to the longitudinal axis 10G is described in more detail below.

Still referring to FIG. 2, the hood 10 also includes a first length "L1" that is measured between the front end 10A and the rear end 10B. The hood 10 also includes a first width "W1" that is measured between the first side 10C and the second side 10D. In the illustrated embodiment, the first length "L1" of the hood 10 is greater than the first width "W1" of the hood 10. In other exemplary embodiments, a hood of a cargo restraint apparatus may define any suitable length and width for desired reasons, including the types of objects and cargo that may be enveloped and supported by a hood. In one instance, a first length of a hood is less than a first width of the hood. In another instance, a first length of a hood is substantially equal to a first width of the hood.

Referring to FIGS. 2 and 3, the hood 10 also defines a chamber 10H that extends from the rear end 10B to the front end 10A. Specifically, the front end 10A, the rear end 10B, the first side 10C, the second side 10D, the top end 10E, and the bottom end 10F collectively define the chamber 10H. The hood 10 also defines an opening or open end 101 at the front end 10A of the hood 10 to provide access into the chamber 10H from the exterior environment of the hood 10. Each of the rear end 10B, the first side 10C, and the second side 10D collectively define a closed end for the hood 10 to define the chamber 10H. As illustrated in FIGS. 1 and 4, the second end 3B of the at least one object 3 may be enveloped and supported by the hood 10 by passes through the opening 101 and into the chamber 10H. The hood 10 also includes an interior surface 10J that extends from the rear end 10B to the front end 10A inside of the chamber 10H; the interior surface 10J is configured to operably engage with and contact the second end 3B of the at least one object 3 when the hood 10 secures the at least one object 3 with the vehicle 2, which is described in more detail below. The hood 10 also includes an exterior surface 10K that extends from the rear end 10B to the front end 10A exterior to the chamber 10H and in communication with the exterior environment surrounding the hood 10. In the illustrated embodiment, the interior surface 10J faces in a first direction into the chamber 10H, and the exterior surface 10K faces in a second direction away from the chamber 10H opposite to the first direction of the interior surface 10J.

Referring to FIGS. 2 and 3, the hood 10 also includes at least one material that operably engages with the exterior surface 10K of the hood 10 proximate to one of the top end 10E and the bottom end 10F. In the illustrated hood 10, a first material 10L operably engages with the exterior surface 10K of the hood 10 proximate to the top end 10E. The first material 10L includes a first end 10L1, a second end 10L2 longitudinally opposite to the first end 10L1, a first side 10L3 positioned between the first end 10L1 and the second end 10L2, and a second side 10L4 transversely opposite to the first side 10L3 and positioned between the first end 10L1 and the second end 10L2.

As illustrated, an outer peripheral edge at each of the first end 10L1, first side 10L3, and the second side 10L4 of the first material 10L is fixedly engaged with the exterior surface 10K of the hood 10 proximate to the top end 10E of the hood 10. As such, the exterior surface 10K and the first material 10L collectively define a first pocket 10L5 that is accessible at the second end 10L2 which is free from engaging the exterior surface 10K; such use and purpose of the first pocket 10L5 is described in more detail below. The first material 10L also defines a first length for the first pocket 10L5 measured from the first end 10L1 to the second end 10L2, which is denoted as "A1" in FIG. 2. The first material 10L also defines a first width for the first pocket 10L5 measured from the first side 10L3 to the second side 10L4, which is denoted as "B1" also in FIG. 2. In the illustrated embodiment, the first width "B1" of the first pocket 10L5 is greater than the first length "A1" of the first pocket 10L5.

Referring to FIG. 2, the first pocket 10L5 is also selectively accessible at the second end 10L2 via a closure mechanism 10L6 provided with the exterior surface 10K and the first material 10L. In the illustrated embodiment, the closure mechanism 10L6 is a hook-and-loop device to provide selective accessibility into the first pocket 10L5. During operation, a user of the cargo restraint apparatus 1 may desire to access the first pocket 10L5 by applying opposing pulling forces on the first material 10L and the exterior surface 10K that are suitable enough to overcome the attachment mechanism between the hook-and-loop device. The user of the cargo restraint apparatus 1 may also desire to restrict access into the first pocket 10L5 by applying pushing forces on the first material 10L and the exterior surface 10K that are suitable enough to adhere the hook-and-loop devices with one another. In other exemplary embodiments, any suitable closure mechanism may be provided with an exterior surface of a hood and a first material of a hood for selectively accessing a first pocket collectively defined by the exterior surface and the first material.

Referring to FIG. 3, the hood 10 also includes a second material 10M that is operably engaged with the exterior surface 10K of the hood 10 proximate to the bottom end 10F and opposite to the first material 10L. Similar to the first material 10L, the second material 10M includes a first end 10M1, a second end 10M2 longitudinally opposite to the first end 10M1, a first side 10M3 positioned between the first end 10M1 and the second end 10M2, and a second side 10M4 transversely opposite to the first side 10M3 and positioned between the first end 10M1 and the second end 10M2.

Similar to the first material 10L, an outer peripheral edge at each of the first end 10M1, first side 10M3, and the second side 10M4 of the second material 10M is fixedly engaged with the exterior surface 10K of the hood 10 proximate to the bottom end 10F. As such, the exterior surface 10K and the second material 10M collectively define a second pocket 10M5 that is accessible via the second end 10M2 which is free from engaging the exterior surface 10K; such use and purpose of the second pocket 10M5 is described in more detail below. As illustrated in FIG. 3, the second material 10M also define a second length for the second pocket 10M5 measured from the first end 10M1 to the second end 10M2, which is denoted as "A2" in FIG. 3. The second material 10M also define a second width for the second pocket 10M5 measured from the first side 10M3 to the second side 10M4, which is denoted as "B2" in FIG. 3. In the illustrated embodiment, the first length "A1" of the first pocket 10L5 is greater than the second length "A2" of the second pocket 10M5, and the first width "B1" of the first pocket 10L5 is greater than the second width "B2" of the second pocket 10M5.

Referring to FIG. 3, the second pocket 10M5 is also selectively accessible at the second end 10M2 via a closure mechanism 10M6 provided with the exterior surface 10K and the second material 10M. In the illustrated embodiment, the closure mechanism 10M6 is a hook-and-loop device (similar to the closure mechanism 10L6) to provide selective accessibility into the second pocket 10M5. During operation, a user of the cargo restraint apparatus 1 may desire to access the second pocket 10M5 by applying opposing pulling forces on the second material 10M and the exterior surface 10K that are suitable enough to overcome the attachment mechanism between the hook-and-loop device. The user of the cargo restraint apparatus 1 may also desire to restrict access into the second pocket 10M5 by applying pushing forces on the second material 10M and the exterior surface 10K that are suitable enough to adhere the hook-and-loop devices with one another. In other exemplary embodiments, any suitable closure mechanism may be provided with an exterior surface of a hood and a second material of a hood for selectively accessing a second pocket collectively defined by the exterior surface and the second material.

Referring to FIGS. 2 and 3, the hood 10 also includes a third material 10N that operably engages with the exterior surface 10K proximate to the front end 10A. The third material 10N also extends circumferentially about the exterior surface 10K and the opening 101 defined by the hood 10. A passageway 10N1 is also collectively defined by the exterior surface 10K and the third material 10N. The passageway 10N1 is accessible by a first aperture 10N2 collectively defined by the exterior surface 10K and the third material 10N that is proximate to the front end 10A. The passageway 10N1 is also accessible by a second aperture 10N3 collectively defined by the exterior surface 10K and the third material 10N that is proximate to the front end 10A and directly opposes the first aperture 10N2. Such use and purpose of the passageway 10N1 is described in more detail below.

Referring to FIGS. 2 and 3, the hood 10 also includes at least one mesh component 10P positioned at one of the rear end 10B, the first side 10C, the second side 10D, the top end 10E, and the bottom end 10F. Generally, the at least one mesh component 10P is configured to exhaust air flow from the chamber 10H of the hood 10 when air travels through the opening 10I and passes into the chamber 10H during transit. Such exhaustion of air flow from the hood 10 via the at least one mesh component 10P prevents unwanted drag on the vehicle 2 created by the hood 10 due to trapping air inside of the hood 10. In the illustrated hood 10, four mesh components 10P are provided at the rear end 10B of the hood 10 proximate to the top end 10E of the hood 10, and another four mesh components 10P are provided at the rear end 10B of the hood 10 proximate to the bottom end 10F of the hood 10. In other exemplary embodiments, any suitable number of mesh components may be provided with a hood of a cargo restraint apparatus at any suitable location on the hood for preventing unwanted drag on a vehicle created by the hood.

Referring to FIGS. 2 and 3, the hood 10 may include reflective or fluorescent piping 10Q may be used as well to advise and/or warn surrounding drivers that the hood 10 and the at least one object 3 are collectively protruding outside of the vehicle 2 during transit. While not illustrated in this embodiment, the hood 10 may also include a safety and/or traveling warning graphic. In these embodiment, the safety graphic is printed on the exterior surface 10K of the hood 10 at the rear end 10B of said hood 10. In other exemplary embodiments, any suitable methods or techniques known in the art may be used to operably engage a safety graphic with an exterior surface of a hood. During operation, the safety graphic advises and/or warns surrounding drivers that the hood 10 and at least one object 3 are collectively protruding outside of a vehicle when traveling. The safety graphic may also have a reflective coating or fluorescent coating to provide suitable visibility that the hood 10 and the at least one object are collectively protruding outside of a vehicle when traveling at any time of day. In other exemplary embodiments, other viable devices and/or signs may be used to advise and/or warn surrounding drivers that a hood and at least one object are collectively protruding outside of a vehicle when traveling (e.g., a flag, illuminated sign, and other devices and signs of the like).

The hood 10 (i.e., parts or elements that form the hood 10) may be made from any suitable materials that are capable of being resistant to tearing and/or ripping when enveloping and support the at least one object 3. The hood 10 (i.e., parts or elements that form the hood 10) may also be made from any suitable materials that are capable of being foldable or rollable for enabling a user to store the hood 10 when not in use (i.e., either folding or rolling the hood 10 into a smaller footprint for storing the hood 10 in a confined area located in a vehicle by). In this stored position, the hood 10 would have a length and a width that is smaller than the length "L1" and the width "W1" when the hood 10 is being used (see FIG. 2). The hood 10 may also be made from any suitable materials that are capable of being properly colored for legally indicating the over-sized load to surrounding motorists. In one example, any hood described and illustrated herein may be made from a strong synthetic fiber (e.g., Kevlar or similar material of the like) or similar fabric material that is cut-resistant and puncture-resistant. In another example, any mesh of a hood described and illustrated herein may be made from a high-strength plastic or polymer mesh or netting material for allowing air-flow through the hood while contouring around asymmetric and/or odd-shaped loads.

The cargo restraint apparatus 1 may also include an attachment strap 20 that operably engages with the hood 10. In the illustrated cargo restraint apparatus 1, the attachment strap 20 operably engages with the interior surface 10J inside of the chamber 10H proximate to the front end 10A of the hood 10 (see FIG. 3). The attachment strap 20 includes a first end 20A remote and free from the hood 10, a second end 20B operably engaged with the interior surface 10J inside of the chamber 10H proximate to the front end 10A of the hood 10 and longitudinally opposite to the first end 20A, and a longitudinal axis 20C defined therebetween parallel with the longitudinal axis 10G of the hood 10.

Referring to FIG. 4, the attachment strap 20 also defines a length 20D that is measured from the first end 20A to the second end 20B. In the illustrated embodiment, the length 20D of the attachment strap 20 is greater than the length L1 of the hood 10. In other exemplary embodiments, the length 20D of the attachment strap 20 may be any suitable length for various considerations, including lengths to match specific truck bed lengths. In one exemplary embodiment, a length of an attachment strap described and illustrated herein may be at least one six feet in length. In another exemplary embodiment, a length of an attachment strap described and illustrated herein may be about eight feet in length.

Referring to FIGS. 2 and 3, the attachment strap 20 includes a base member 20E that operably engages with one of the interior surface 10J and the exterior surface 10K of the hood 10. In the illustrated embodiment, the base member 20E operably engages with the interior surface 10J of the hood 10 inside of the chamber 10H proximate to the front end 10A. The base member 20E extends longitudinally between the first end 20A and the second end 20B. The base member 20E also includes a first surface 20E1 that extends between the first end 20A and the second end 20B and faces in a first direction. The base member 20E also includes a second surface 20E2 that also extends between the first end 20A and the second end 20B and faces in a second direction opposite to the first surface 20E1. During operation, the second surface 20E2 contacts a surface of the at least one object 3 being secured to the vehicle 2 by the cargo restraint apparatus 1.

Referring to FIG. 2, the attachment strap 20 also includes an attachment member 20F that is operably engages with at least one portion of the base member 20E. More particularly, the attachment member 20F operably engages with at least one portion of the first surface 20E1 of the base member 20E. Specifically, in the illustrated attachment strap 20, the attachment member 20F operably engages with the first surface 20E1 of the base member 20E at a plurality of connection positions denoted 20G. Such plurality of connection positions 20G between the base member 20E and the attachment member 20F collectively creates a plurality of attachment points or loops 20H between two connection positions of the plurality of connection positions 20G. As illustrated, the plurality of attachment points 20H are loops that enable securing mechanism (e.g. bungee cords, rope, tie-down ratchet straps, etc.) to operably engage with the attachment strap 20 when securing the first end 3A of the at least one object 3 with the vehicle 2, which is described in more detail below. In other exemplary embodiments, each attachment point of a plurality of attachment points may define any suitable shape, size, or configuration that is suitable for receiving a securing mechanism, particularly a commercially available tie-down strap for a tie-down ratchet strap, to operably engage with an attachment strap of a cargo restraint apparatus when securing at least one object with a vehicle.

Still referring to FIG. 2, each attachment point of the plurality of attachment points 20H may define a length 201 that is measured between a first connection position of the plurality of connection positions 20G and a second connection position of the plurality of connection positions 20G opposite to the first connection position. In one example, as illustrated in FIG. 2, a first attachment point 20H1 defines a first length 201 measured between a first connection position 20G1 of the plurality of connection positions 20G and a second connection position 20G2 of the plurality of connection positions 20G opposite to the first connection position 20G1 (see FIG. 2). In this same example, the remaining attachment points of the plurality of attachment points define a substantially similar length 201 between respective first and second connection positions of the plurality of connections positions 20G. In one exemplary embodiment, each attachment point of an attachment member may have a length of about seven inches between a first connection position of a plurality of connection positions and a second connection position of the plurality of connection positions. In another exemplary embodiment, each attachment point of an attachment member has a length that is suitable for receiving a commercially available tie-down strap for a tie-down ratchet strap for securing purposes, which is described in more detail below.

In the illustrated embodiment, each attachment point of the plurality of attachment points 20H is directly adjacent with one another in that the plurality of attachment points 20H are continuous and uninterrupted between the first end 20A and the second end 20B of the attachment strap 20. In other exemplary embodiments, each attachment point of a plurality of attachment points of an attachment strap may be spaced at a desired distance from one another. In one exemplary embodiment, each attachment point of a plurality of attachment points of an attachment strap may be spaced one and one-half feet between one another.

The attachment strap 20 (i.e., parts or elements that form the attachment strap 20) may be made from any suitable materials that are capable of being abrasion resistant when directly contacting or interfacing with objects or loads. The attachment strap 20 (i.e., parts or elements that form the attachment strap 20) may also be made from any suitable materials that are capable of being moisture resistant when being used in wet conditions (i.e., rain, sleet, snow, ice, and other forms of precipitation that may be normally experienced). In one example, a base member of an attachment strap described and illustrated herein may be made from a polyester webbing material capable of being abrasion resistant when directly contacting or interfacing with objects or loads and being moisture resistant when being used in wet conditions. In another example, an attachment member of an attachment strap described and illustrated herein may be made from a polyester webbing material capable of being abrasion resistant when directly contacting or interfacing with objects or loads and being moisture resistant when being used in wet conditions.

The cargo restraint apparatus 1 may also include at least one anchoring assembly that operably engages with one or both of the hood 10 and the attachment strap 20. As described in more detail below, the at least one anchoring assembly is configured to anchor and secure the second end 3B of the at least one object 3 and the hood 10 at a second position of the vehicle 2 even through the hood 10 and the second end 3B of the at least one object 3 is past the rear end 2B of the vehicle 2. In the illustrated embodiment, the cargo restraint apparatus 1 includes a first anchoring assembly 30 that operably engages with one or both of the hood 10 and the attachment strap 20. Specifically, the first anchoring assembly 30 operably engages with the base member 20E of the attachment strap 20 proximate to the second end 20B of the attachment strap 20.

Referring to FIGS. 2 and 3, the first anchoring assembly 30 includes a strap 30A. The strap 30A includes a first end 30A1 that operably engages with the base member 20E of the attachment strap 20 and a second end 30A2 longitudinally opposite to the first end 30A1 and remote from the attachment strap 20. The first anchoring assembly 30 also includes an anchoring member 30B that operably engages with the second end 30A2 of the strap 30A. In the illustrated embodiment, the anchoring member 30B is a S-shaped hook member for engaging the first anchoring assembly 30 with one of the first tie-down 2D1, the second tie-down 2D2, the third tie-down 2D3, or the fourth tie-down 2D4, which is described in more detail below. In other exemplary embodiments, any suitable device or component may be used for engaging a first anchoring assembly with a tie-down of a vehicle.

Still referring to FIGS. 2 and 3, the first anchoring assembly 30 also includes an adjustment mechanism 30C that operably engages with the strap 30A. In operation, the adjustment mechanism 30C is configured to apply tension to the strap 30A between the hood 10 and a vehicle for securing the hood 10 and a first end of the at least one object with the vehicle. In the illustrated embodiment, the adjustment mechanism 30C is a ratcheting handle that is configured to apply tension to the strap 30A between the hood 10 and the vehicle 2 for securing the hood 10 and the rear end 2B of the at least one object 3 with the vehicle 2. In other exemplary embodiments, any suitable device or mechanism that is preexisting or commercially available may be used to apply tension to a strap between a hood and a vehicle for securing the hood and a second end of the at least one object with the vehicle.

In the illustrated embodiment, the cargo restraint apparatus 1 also includes a second anchoring assembly 40 that operably engages with one or both of the hood 10 and the attachment strap 20. Specifically, the second anchoring assembly 40 operably engages with the base member 20E of the attachment strap 20 proximate to the second end 20B of the attachment strap 20. The second anchoring assembly 40 is also positioned in an opposing direction as compared to the first anchoring assembly 30 relative to the attachment strap 20.

Referring to FIGS. 2 and 3, the second anchoring assembly 40 includes a strap 40A. The strap 40A includes a first end 40A1 that operably engages with the base member 20E of the attachment strap 20 and a second end 40A2 longitudinally opposite to the first end 40A1 and remote from the attachment strap 20. The second anchoring assembly 40 also includes an anchoring member 40B that operably engages with the second end 40A2 of the strap 40A. In the illustrated embodiment, the anchoring member 40B is a S-shaped hook member for engaging the second anchoring assembly 40 with one of the first tie-down 2D1, the second tie-down 2D2, the third tie-down 2D3, or the fourth tie-down 2D4, which is described in more detail below. In other exemplary embodiments, any suitable device or component may be used for engaging a second anchoring assembly with a tie-down of a vehicle.

Still referring to FIGS. 2 and 3, the second anchoring assembly 40 also includes an adjustment mechanism 40C that operably engages with the strap 40A. In operation, the adjustment mechanism 40C is configured to apply tension to the strap 40A between the hood 10 and a vehicle for securing the hood 10 and a first end of the at least one object with the vehicle. In the illustrated embodiment, the adjustment mechanism 40C is a ratcheting handle that is configured to apply tension to the strap 30A between the hood 10 and the vehicle 2 for securing the hood 10 and the rear end 2B of the at least one object 3 with the vehicle 2. In other exemplary embodiments, any suitable device or mechanism that is preexisting or commercially available may be used to apply tension to a strap between a hood and a vehicle for securing the hood and a second end of the at least one object with the vehicle.

In the illustrated embodiment, the strap 30A of the first anchoring assembly 30 is fixedly attached with the base member 20E of the attachment strap 20; more specifically, strap 30A of the first anchoring assembly 30 is stitched and/or sown to the base member 20E of the attachment strap 20. As such, the first anchoring assembly 30 is permanently fixed with the attachment strap 20 and is integral with the attachment strap 20. In the illustrated embodiment, the strap 40A of the second anchoring assembly 40 is also fixedly attached with the base member 20E of the attachment strap 20; more specifically, strap 40A of the second anchoring assembly 40 is stitched and/or sown to the base member 20E of the attachment strap 20. As such, the second anchoring assembly 40 is also permanently fixed with the attachment strap 20 and is integral with the attachment strap 20.

The cargo restraint apparatus 1 also includes a draw-cord mechanism 50 that operably engages with the hood 10. In the illustrated embodiment, a portion of the draw-cord mechanism 50 is housed inside of the passageway 10N1 collectively defined by the exterior surface 10K of the hood 10 and the third material 10N. As described in more detail below, the draw-cord mechanism 50 is configured to selectively set the diameter of the opening 101 defined by the hood 10 to enable the hood 10 and the draw-cord mechanism 50 to operably engage with the at least one object 3 for cinching purposes.

Referring to FIGS. 2 and 3, the draw-cord mechanism 50 includes a draw-cord 50A. The draw-cord 50A includes a first end 50A1 that is positioned outside of the passageway 10N1 of the hood 10 and a second end 50A2 positioned opposite to the first end 50A1 and positioned outside of the passageway 10N1. A major portion 50A3 defined between the first end 50A1 and the second end 50A2 is generally housed inside of the passageway 10N1 when the opening 101 of the hood 10 is set at its maximum diameter. The draw-cord mechanism 50 also includes a retaining member 50B that operably engages with the draw-cord 50A at at least one position between the first end 50A1 and the second end 50A2. In the illustrated embodiment, the retaining member 50B is releasably secured with the draw-cord 50A to maintain the draw-cord 50A at a desired diameter for cinching the hood 10 and the draw-cord 50A about the at least one object 3. The draw-cord mechanism 50 may also include a clasp 50C that engages the draw-cord 50A to maintain the ends 50A1, 50A2 of the draw-cord 50A with one another.

In the exemplary embodiment, the draw-cord 50A of the draw-cord mechanism 50 may be made of any suitable material that enables a user of the cargo restraint apparatus 1 to open and close the opening 101 of the hood 10 with ease during securement and/or restraint operations. In one instance, a draw-cord of a draw-cord mechanism described and illustrated herein may be made from polyester material or similar material of the like.

Having now described the assemblies and components of the cargo restraint apparatus 1, a method of using the cargo restraint apparatus 1 for securing at least one object with a vehicle is described in more detail below.

Prior to introducing the cargo restraint apparatus 1, the at least one object 3 is loaded into the storage area 2C of the vehicle 2 by at least one person. Once the at least one object 3 is loaded into the storage area 2C of the vehicle 2, the first end 3A of the at least one object 3 is positioned proximate to the front end 2A of the vehicle 2 at a first position, and the second end 3B of the at least one object 3 is positioned past the rear end 2B of the vehicle 2 at a second position longitudinally opposite to the first end 3A.

Prior to introducing the cargo restraint apparatus 1, the user may need to remove the attachment strap 20 and the draw-cord mechanism 50 from the hood 10 if the cargo restraint apparatus 1 is provided in a stored position. As described previously, the attachment strap 20 may be stored in the first pocket 10L5 of the hood 10 when the cargo restraint apparatus 1 is provided in the stored position. As such, the user would need to operably disengage the first material 10L from the exterior surface 10K of the hood 10 by applying opposing pulling forces on the first material 10L and the exterior surface 10K to overcome the attachment mechanism of the closure mechanism 10L6. Once opened, the user may then remove the attachment strap 20 from the first pocket 10L5 to use the attachment strap 20. Similarly, the draw-cord mechanism 50 may also be stored in the second pocket 10M5 of the hood 10 when the cargo restraint apparatus 1 is provided in the stored position. As such, the user would need to operably disengage the second material 10M from the exterior surface 10K of the hood 10 by applying opposing pulling forces on the second material 10M and the exterior surface 10K to overcome the attachment mechanism of the closure mechanism 10M6. Once opened, the user may then remove retaining member 50B and portions of the draw-cord 50A from the second pocket 10M5 to use the draw-cord mechanism 50.

Once the at least one object 3 is loaded into the storage area 2C of the vehicle 2, the cargo restraint apparatus 1 may then be introduced to the vehicle 2 and the at least one object 3. As such, a user may first place the hood 10 over the second end 3B of the at least one object 3. Specifically, the second end 3B of the at least one object 3 would pass through the opening 101 of the hood 10 and into the chamber 10H where the hood 10 would envelop the second end 3B of the at least one object 3. The second end 3B of the at least one object 3 also operably engage with the interior surface 10J of the hood 10 once the hood 10 is placed over the second end 3B of the at least one object 3.

Once the hood 10 is placed over a portion of the at least one object 3 proximate to the second end 38, the user may then tighten and cinch the hood 10 circumferential about the at least one object 3. Specifically, the user pulls on each of the first end 50A1 and the second end 50A2 of the draw-cord 50A in a first direction while simultaneously pushing the retaining member 50B in a second direction opposite to the first direction to gradually shrink the diameter of the opening 101 of the hood 10. The user may continue this tightening process with the draw-cord mechanism 50 until the draw-cord 50A ceases to shrink the diameter of the opening 101 of the hood 10 when the hood 10 is cinched with the at least one object 3. This cinching operation of the draw-cord mechanism 50 enables the hood 10 to tightly bundle multiple items or objects with one another inside of the hood 10. As illustrated in FIGS. 1 and 4, the draw-cord 50A tightly bundles the three piece of lumber with one another at the second ends 3B of each piece of lumber. The retaining member 50B is also configured to retain the position of the draw-cord 50A at the smaller diameter to maintain the tightly bundled items and objects inside of the hood 10 when in transit.

Once the hood 10 is cinched with the at least one object 3, the user may then orient the attachment strap 20 along the length of the at least one object 3 spanning from the hood 10 towards the first end 3A of the at least one object 3. Once oriented, the first end 20A of the attachment strap 20 is disposed inside of the storage area 2C of the vehicle proximate to the front end 2A of the vehicle 2. Additionally, the first end 20A of the attachment strap 20 is also disposed proximate to the first end 3A of the at least one object 3. In this position, the second surface 20E2 of the base member 20E contacts an outer surface of one of the pieces of lumber 3 along the longitudinal axis of the piece of lumber. In this position, the attachment member 20F is also facing in an upward direction away from the at least one object 3.

Once the attachment strap 20 has been oriented with the at least one object, a user may then introduce at least one securing mechanism 60 and operably engage the at least one securing mechanism 60 with the attachment strap 20. In the illustrated embodiment, a single mechanism 60 is being used for restraining and/or securing the at least one object 3 with the vehicle 2 via the cargo restraint apparatus 1. As illustrated, the securing mechanism 60 may be an existing or commercially available tie-down ratchet strap that is separate and independent from the attachment strap 20. Generally, the securing mechanism 60 may include a strap 60A that includes a first end 60B with an attachment member 60B1 (e.g., a hook) and a second end 60C longitudinally opposite to the first end. The securing mechanism 60 may also include an adjustment member 60D (e.g., a ratchet handle) engaged with a strap 60D1 having an attachment member 60D2 (e.g., a hook) engaged with the strap 60D1 opposite to the adjustment member 60D. During operation, the adjustment member 60D operably engages with the strap 60A for setting a desired tension along the strap 60A for securing purposes.

Once the securing mechanism 60 is introduced, the user may then selectively operably engage the securing mechanism 60 with the attachment strap 20 at a position between the first end 20A of the attachment strap 20 and the second end 20B of the attachment strap 20. Specifically, the user may selectively operably engage the strap 60A of the securing mechanism 60 with any attachment point of the plurality of attachment points 20H provided on the attachment member 20F. As illustrated in FIG. 4, the user attaches the attachment member 60B1 with the second tie-down anchor 2D2 of the vehicle 2 and feeds the strap 60A through a selected attachment point of the plurality of attachment points 20H, which is labeled as 20H2 in FIG. 4. The user feeds the strap 60A through the selected attachment point 20H2 to restrain and secure the attachment strap 20 and first end 3A of the at least one object 3 with the vehicle 2. Once the strap 60A is feed through the selected attachment point 20H2, the user then attaches the attachment member 60D2 with the first tie-down anchor 2D1 of the vehicle 2 and adjusts the securing mechanism 60 until the strap 60A cinches with the at least one object 3 to a desired tension where the attachment strap 20 and the first end of the at least one object 3 are secured with the vehicle 2.

The structural configuration between the attachment strap 20 and the securing mechanism 60 is considered advantageous at least because the attachment strap 20 provides a user to choose and/or select from more than one attachment and/or anchoring position along the at least one object 3 to secure the at least one object 3 with the vehicle 2. Here, each attachment point of the plurality of attachment points 20H of the attachment strap 20 enables the securing mechanism 60 to apply a pulling force on the at least one object 3 towards the front end 2A of the vehicle 2 via the plurality of attachment points 20H of the attachment strap 20. The structural configuration between the attachment strap 20 and the securing mechanism 60 is considered advantageous at least because this engagement between the attachment strap 20 and the securing mechanism 60 prevents the first end 3A of the at least one object 3 from shifting or sliding in a longitudinal direction, a transverse direction, and a vertical direction inside of the storage area 2C when transporting the at least one object 3. The structural configuration between the attachment strap 20 and the securing mechanism 60 is considered advantageous at least because this engagement longitudinally pulls the hood 10 towards the front end 2A of the vehicle 2 and, consequently, pulls the second end 3B of the at least one object 3 towards the front end 2A of the vehicle 2.

Once the first end 3A of the at least one object 3 is secured with the vehicle 2 by engagement between the attachment strap 20 and the securing mechanism 60, the user may then restrain and secure the second end 3B of the at least one object 3 with the vehicle 2 via the first anchoring assembly 30 and the second anchoring assembly 40. Specifically, the user may operably engage the anchoring member 30B with the third tie-down anchor 2D3 of the vehicle 2. Once the anchoring member 30B operably engages with the third tie-down anchor 2D3 of the vehicle 2, the user then adjusts the strap 30A, via the adjustment mechanism 30C, until the strap 30A cinches the at least one object 3 and the hood 10 with the vehicle 2 to a desired tension to secure the at least one object 3 and the hood 10 with the vehicle 2. Similarly, the user may also operably engage the anchoring member 40B with the fourth tie-down anchor 2D4 of the vehicle 2. Once the anchoring member 40B operably engages with the fourth tie-down anchor 2D4 of the vehicle 2, the user then adjusts the strap 40A, via the adjustment mechanism 40C, until the strap 40A cinches the at least one object 3 and the hood 10 with the vehicle 2 to a desired tension to secure the at least one object 3 and the hood 10 with the vehicle 2. Upon securement, the first anchoring assembly 30 and the second anchoring assembly 40 secure the second end 3B of the at least one object 3 at a second position with vehicle 2 longitudinally opposite to the first position of the first end 3A of the at least one object 3.

The configuration of the cargo restraint apparatus 1 for securing long and cumbersome objects (e.g., at least one object 3) with the vehicle 2 is considered advantageous at least because the cargo restraint apparatus 1 provides two securement positions that are longitudinally opposite to one another relative to the longitudinal direction of the vehicle 2 for restraining the objects with the vehicle 2. While transporting the at least one object 3 with assistance from the cargo restraint apparatus 1, the configuration of the cargo restraint apparatus 1 prevents the first end 3A of the at least one object 3 from shifting or sliding in a longitudinal direction, a transverse direction, and a vertical direction inside of the storage area 2C when transporting the at least one object 3 due to the engagement between the attachment strap 20 and the securement mechanism 60. While transporting the at least one object 3 with assistance from the cargo restraint apparatus 1, the configuration of the cargo restraint apparatus 1 also prevents the second end 3B of the at least one object 3 from shifting or sliding in a longitudinal direction, a transverse direction, and a vertical direction inside of the storage area 2C when transporting the at least one object 3 via due to the engagement between hood 10 and each of the first anchoring assembly 30 and the second anchoring assembly 40.

The configuration of the cargo restraint apparatus 1 for securing long and cumbersome objects (e.g., at least one object 3) with the vehicle 2 is also considered advantageous at least because the cargo restraint apparatus 1 applies tension to the at least one object 3 in two different directions relative to the longitudinal direction of the vehicle 2. As discussed above, the engagement between the attachment strap 20 and the securing mechanism 60 pulls the hood 10 and the at least one object 3 in a first direction towards the front end 2A of the vehicle 2 to secure the at least one object 3 at a first position with the vehicle 2 via the cargo restraint apparatus 1. As also discussed above, the engagement between the hood 10, the first anchoring assembly 30, and the second anchoring assembly 40 pulls the hood 10 and the at least one object 3 in a second direction into the storage area 2C of the vehicle 2 to secure the at least one object 3 at a second position (longitudinally opposite to the first position) with the vehicle 2 via the cargo restraint apparatus 1. With such first and second directions, the cargo restraint apparatus 1 prevents the first end 3A and the second end 3B of the at least one object 3 from shifting or sliding in a longitudinal direction, a transverse direction, and a vertical direction inside of the storage area 2C when transporting the at least one object 3 via due to the engagement of the cargo restraint apparatus 1.

The configuration of the cargo restraint apparatus 1 is also considered advantageous at least because the cargo restraint apparatus 1 enables users to securely engage at least one object with a vehicle where the at least one object protrudes outside the bounds of the vehicle. As described above and illustrated in FIGS. 1 and 4, the cargo restraint apparatus 1 is configured to restrain and secure long and cumbersome objects at a first position that is located within the bounds of the vehicle 2 and at a second position longitudinally opposite to the first position that is located outside the bounds of the vehicle 2. In other words, the cargo restraint apparatus 1 is configured to restrain and secure long and cumbersome objects at a first position that is located inside of the storage area 2C of the vehicle 2 and at a second position longitudinally opposite to the first position that is located outside and/or remove from the storage area 2C of the vehicle 2.

Figure 5A:
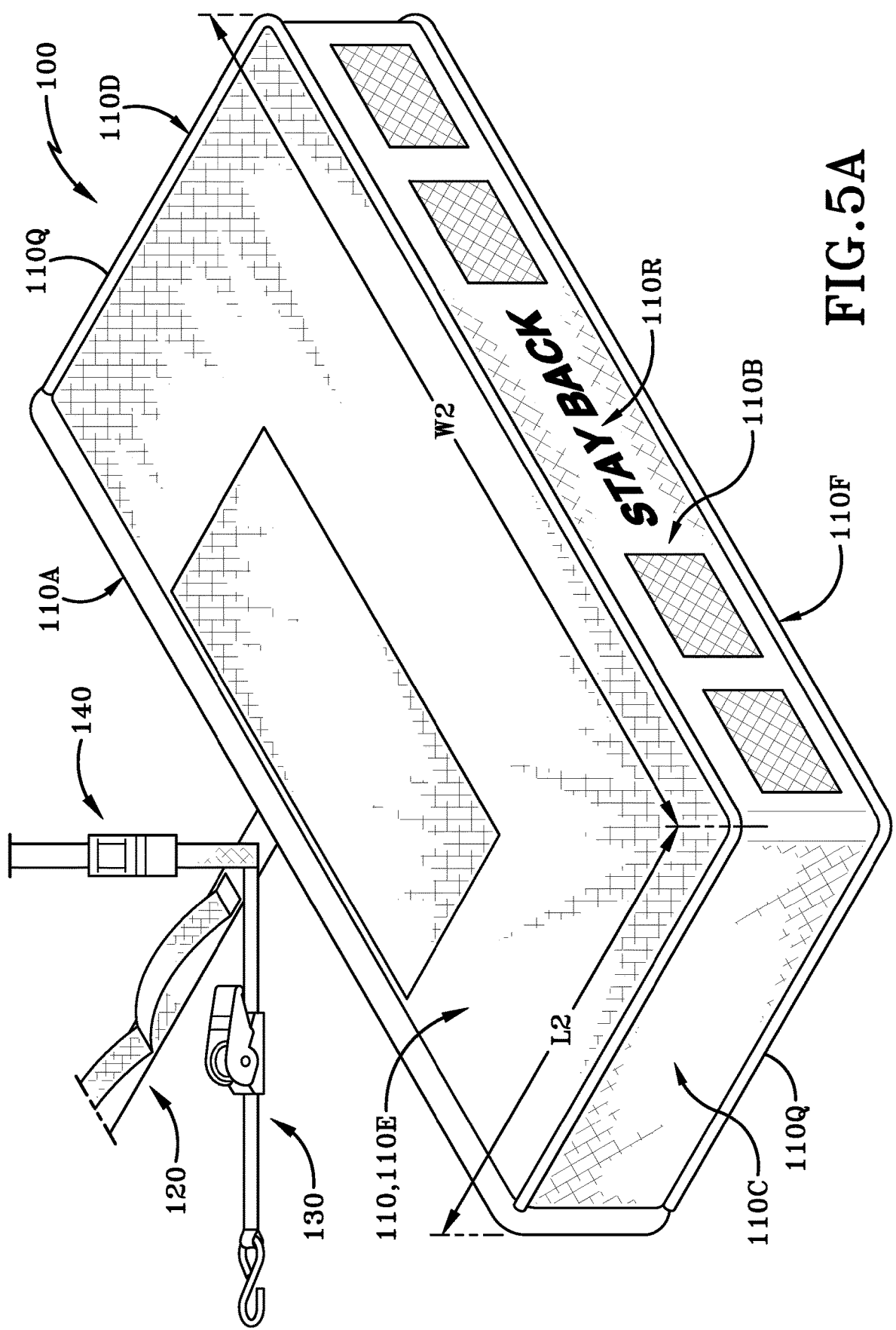
FIG. 5A is a top, rear, first side isometric perspective view of another cargo restraint apparatus in accordance with an aspect of the present disclosure.

FIG. 5A is another cargo restraint apparatus generally labeled as 100. The cargo restraint apparatus 100 is similar to the cargo restraint apparatus 1 illustrated in FIGS. 1-4 and as previously described above. Specifically, a hood 110, an attachment strap 120, a first anchoring assembly 130, a second anchoring assembly 140, and a draw-cord mechanism (not illustrated) are similar to the hood 10, attachment strap 20, first anchoring assembly 30, second anchoring assembly 40, and draw-cord mechanism 50 of the cargo restraint apparatus 1, except as detailed below.

Referring to FIG. 5A, the hood 110 of the cargo restraint apparatus 100 is similar to the hood 10 of the cargo restraint apparatus 1. Specifically, the hood 110 includes a first or front end 110A, a second or rear end 110B, a first side 110C, a second side 110D, a third or top end 110E, and a fourth or bottom end 110F similar to the front end 10A, rear end 10B, first side 10C, second side 10D, top end 10E, and bottom end 10F of the cargo restraint apparatus 1 described above. The hood 110 also defines a second length "L2" measured from the front end 110A to the rear end 110B and a second width "W2" measured from the first side 110C to the second side 110D. In comparison to the cargo restraint apparatus 1 described above, the second width "W2" of the hood 110 is greater than the first width "W1" of the hood 10. As such, the hood 110 of the cargo restraint apparatus 100 is configured to envelop and support objects and material with a width up to about four feet with a vehicle.

Still referring to FIG. 5A, the hood 110 may include reflective or fluorescent piping 110Q may be used as well to advise and/or warn surrounding drivers that the hood 110 and at least one object are collectively protruding outside of a vehicle during transit. The hood 110 of the cargo restraint apparatus 100 may also include a safety and/or traveling warning graphic 110R for denoting an over-sized load. In this embodiment, the safety graphic 110R is printed on the hood 110 at the rear end 1108 of said hood 110. In other exemplary embodiments, any suitable methods or techniques known in the art may be used to operably engage a safety graphic with an exterior surface of a hood. During operation, the safety graphic advises and/or warns surrounding drivers that the hood 110 and at least one object are collectively protruding outside of a vehicle when traveling to notify of an over-sized load. The safety graphic may also have a reflective coating or fluorescent coating to provide suitable visibility that the hood 110 and the at least one object are collectively protruding outside of a vehicle when traveling at any time of day. In other exemplary embodiments, other viable devices and/or signs may be used to advise and/or warn surrounding drivers that a hood and at least one object are collectively protruding outside of a vehicle when traveling (e.g., a flag, illuminated sign, and other devices and signs of the like).

Figure 5B:
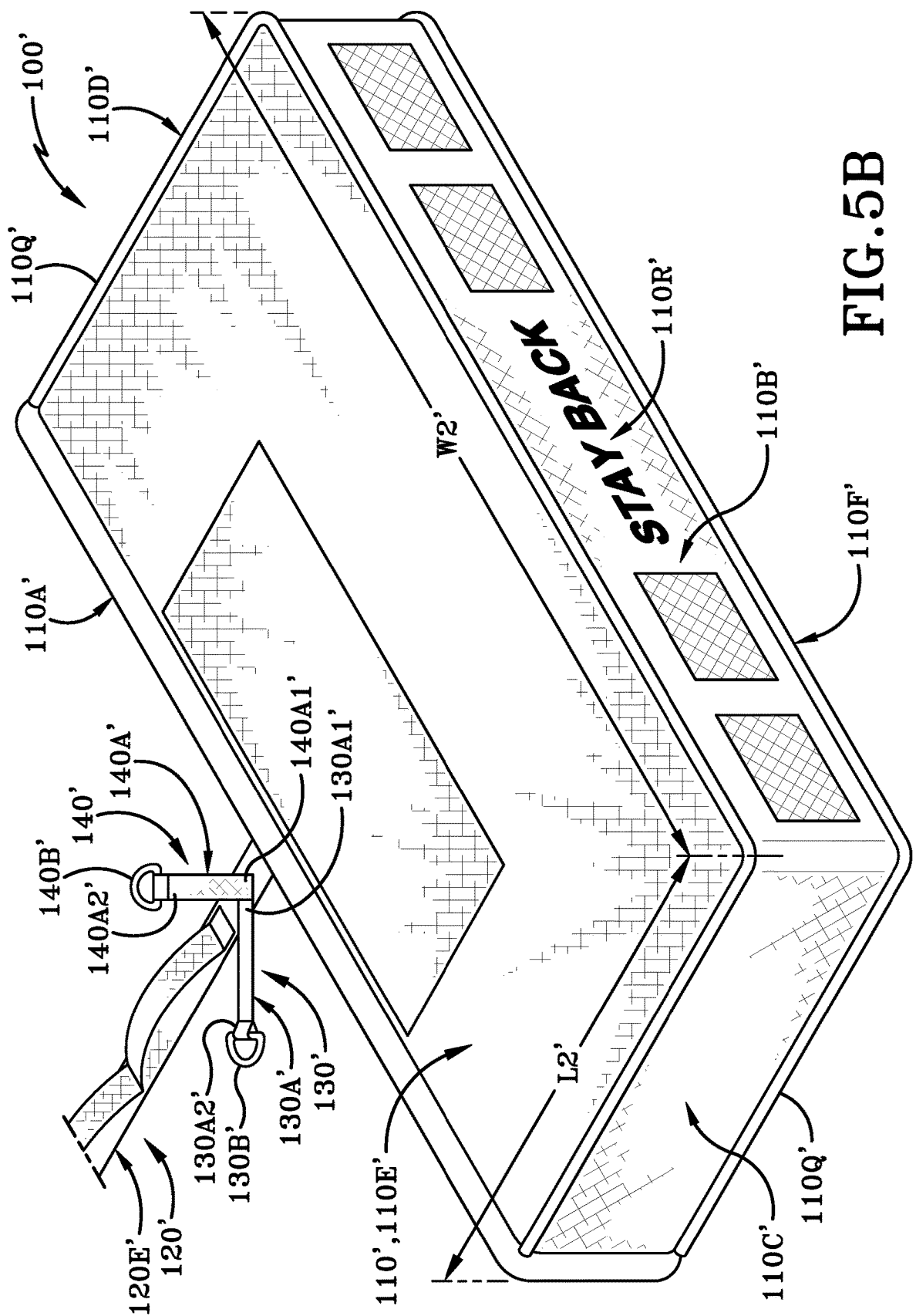
FIG. 5B is a top, rear, first side isometric perspective view of another cargo restraint apparatus in accordance with an aspect of the present disclosure.

FIG. 5B is an alternative cargo restraint apparatus, generally labeled as 100', is similar to the cargo restraint apparatus 100 illustrated in FIG. 5A and as previously described above. Specifically, a hood 110', an attachment strap 120', a first anchoring assembly 130', a second anchoring assembly 140', and a draw-cord mechanism (not illustrated) are similar to the hood 110, attachment strap 120, first anchoring assembly 130, second anchoring assembly 140, and draw-cord mechanism (not illustrated) of the cargo restraint apparatus 100, except as detailed below.

Referring to FIG. 5B, the hood 110' of the cargo restraint apparatus 100' is similar to the hood 110 of the cargo restraint apparatus 100. Specifically, the hood 110' includes a first or front end 110A', a second or rear end 1108', a first side 110C', a second side 110D', a third or top end 110E', and a fourth or bottom end 110F' similar to the front end 110A, rear end 110B, first side 110C, second side 110D, top end 110E, and bottom end 110F of the cargo restraint apparatus 100 described above. The hood 110' also defines a second length "12'" measured from the front end 110A' to the rear end 110B' and a second width "W2'" measured from the first side 110C' to the second side 110D'. In comparison to the cargo restraint apparatus 1 described above, the second width "W2'" of the hood 110' is greater than the first width "W1" of the hood 10. As such, the hood 110' of the cargo restraint apparatus 100' is configured to envelop and support objects and material with a width up to about four feet with a vehicle.

Still referring to FIG. 5B, the hood 110' may include reflective or fluorescent piping 110Q' may be used as well to advise and/or warn surrounding drivers that the hood 110' and at least one object are collectively protruding outside of a vehicle during transit. The hood 110' of the cargo restraint apparatus 100' may also include a safety and/or traveling warning graphic 110R' for denoting an over-sized load. In this embodiment, the safety graphic 110R' is printed on the hood 110' at the rear end 110B' of said hood 110'. In other exemplary embodiments, any suitable methods or techniques known in the art may be used to operably engage a safety graphic with an exterior surface of a hood. During operation, the safety graphic advises and/or warns surrounding drivers that the hood 110' and at least one object are collectively protruding outside of a vehicle when traveling to notify of an over-sized load. The safety graphic may also have a reflective coating or fluorescent coating to provide suitable visibility that the hood 110' and the at least one object are collectively protruding outside of a vehicle when traveling at any time of day. In other exemplary embodiments, other viable devices and/or signs may be used to advise and/or warn surrounding drivers that a hood and at least one object are collectively protruding outside of a vehicle when traveling (e.g., a flag, illuminated sign, and other devices and signs of the like).

Still referring to FIG. 5B, the first anchoring assembly 130' includes a strap 130A'. The strap 130A' includes a first end 130A1' that operably engages with a base member 120E' of the attachment strap 120' and a second end 130A2' longitudinally opposite to the first end 130A1' and remote from the attachment strap 120'. The first anchoring assembly 130' also includes an anchoring member 130B' that operably engages with the second end 130A2' of the strap 130A'. In the illustrated embodiment, the anchoring member 1306' is a D-shaped ring for engaging the first anchoring assembly 130' with a separate and independent securement mechanism, such as bungee cords, ropes, tie-down ratcheting straps, and other devices of the like for operably engaging with the anchoring member 130B'. As such, this separate and independent securement mechanism would then operably engage with one of the first tie-down 2D1, the second tie-down 2D2, the third tie-down 2D3, or the fourth tie-down 2D4 of the vehicle 2 for engaging the first anchoring assembly 130' with the vehicle 2.

As illustrated in FIG. 5B, the first anchoring assembly 130' omits an adjustment member (e.g., adjustment mechanism 30C) since a separate and independent securement mechanism operably engages with the anchoring member 130B' in the illustrated first anchoring assembly 130'. Such omission of the adjustment member may make the cargo restraint apparatus 100' lighter and less cumbersome when storing the cargo restraint apparatus 100' or when using the cargo restraint apparatus 100'.

Still referring to FIG. 5B, the second anchoring assembly 140' includes a strap 140A'. The strap 140A' includes a first end 140A1' that operably engages with the base member 120E' of the attachment strap 120' and a second end 140A2' longitudinally opposite to the first end 140A1' and remote from the attachment strap 120'. The second anchoring assembly 140' also includes an anchoring member 1406' that operably engages with the second end 140A2' of the strap 140A'. In the illustrated embodiment, the anchoring member 140B' is a D-shaped ring for engaging the second anchoring assembly 140' with a separate and independent securement mechanism, such as bungee cords, ropes, tie-down ratcheting straps, and other devices of the like for operably engaging with the anchoring member 140B'. As such, this separate and independent securement mechanism would then operably engage with one of the first tie-down 201, the second tie-down 2D2, the third tie-down 2D3, or the fourth tie-down 2D4 of the vehicle 2 for engaging the second anchoring assembly 140' with the vehicle 2.

As illustrated in FIG. 5B, the second anchoring assembly 140' also omits an adjustment member (e.g., adjustment mechanism 40C) since a separate and independent securement mechanism operably engages with the anchoring member 140B' in the illustrated second anchoring assembly 140'. Such omission of the adjustment member may make the cargo restraint apparatus 100' lighter and less cumbersome when storing the cargo restraint apparatus 100' or when using the cargo restraint apparatus 100'.

Figure 5C:
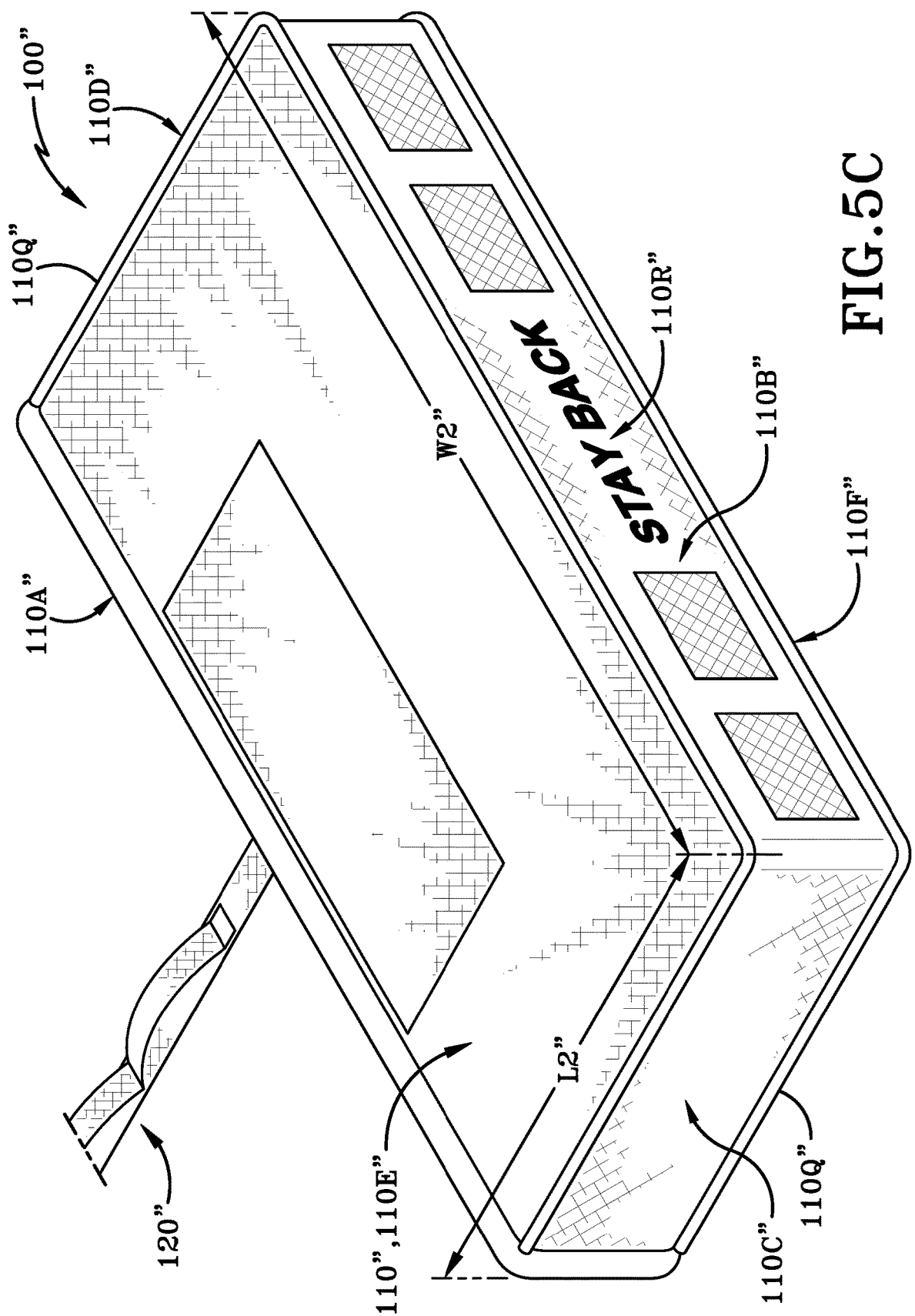
FIG. 5C is a top, rear, first side isometric perspective view of another cargo restraint apparatus in accordance with an aspect of the present disclosure.

FIG. 5C is another alternative cargo restraint apparatus, generally labeled as 100", is similar to the cargo restraint apparatus 100 illustrated in FIG. 5A and as previously described above. Specifically, a hood 110", an attachment strap 120" and a draw-cord mechanism (not illustrated) are similar to the hood 110, attachment strap 120 and draw-cord mechanism (not illustrated) of the cargo restraint apparatus 100, except as detailed below.

Referring to FIG. 5C, the hood 110" of the cargo restraint apparatus 100" is similar to the hood 110 of the cargo restraint apparatus 100. Specifically, the hood 110" includes a first or front end 110A", a second or rear end 110B", a first side 110C", a second side 110D", a third or top end 110E", and a fourth or bottom end 110F" similar to the front end 110A, rear end 110B, first side 110C, second side 110D, top end 110E, and bottom end 110F of the cargo restraint apparatus 100 described above. The hood 110" also defines a second length "L2"" measured from the front end 110A' to the rear end 110B' and a second width "W2"" measured from the first side 110C' to the second side 110D'. In comparison to the cargo restraint apparatus 1 described above, the second width "W2"" of the hood 110' is greater than the first width "W1" of the hood 10. As such, the hood 110" of the cargo restraint apparatus 100" is configured to envelop and support objects and material with a width up to about four feet with a vehicle.

Still referring to FIG. 5C, the hood 110" may include reflective or fluorescent piping 110Q" may be used as well to advise and/or warn surrounding drivers that the hood 110" and at least one object are collectively protruding outside of a vehicle during transit. The hood 110" of the cargo restraint apparatus 100" may also include a safety and/or traveling warning graphic 110R" for denoting an over-sized load. In this embodiment, the safety graphic 110R" is printed on the hood 110" at the rear end 110B" of said hood 110". In other exemplary embodiments, any suitable methods or techniques known in the art may be used to operably engage a safety graphic with an exterior surface of a hood. During operation, the safety graphic advises and/or warns surrounding drivers that the hood 110" and at least one object are collectively protruding outside of a vehicle when traveling to notify of an over-sized load. The safety graphic may also have a reflective coating or fluorescent coating to provide suitable visibility that the hood 110" and the at least one object are collectively protruding outside of a vehicle when traveling at any time of day. In other exemplary embodiments, other viable devices and/or signs may be used to advise and/or warn surrounding drivers that a hood and at least one object are collectively protruding outside of a vehicle when traveling (e.g., a flag, illuminated sign, and other devices and signs of the like).

As illustrated in FIG. 5B, the cargo restraint apparatus 100" omits a first anchoring assembly (e.g., first anchoring assembly 30, 130, 130') since a separate and independent securement mechanism operably engages with the attachment strap 120" in the illustrated cargo restraint apparatus 100". The cargo restraint apparatus 100" also omits a second anchoring assembly (e.g., second anchoring assembly 40, 140, 140') since a separate and independent securement mechanism operably engages with the attachment strap 120" in the illustrated cargo restraint apparatus 100". Such omission of a first anchoring assembly and a second anchoring assembly may make the cargo restraint apparatus 100" lighter and less cumbersome when storing the cargo restraint apparatus 100" or when using the cargo restraint apparatus 100".

Figure 6:
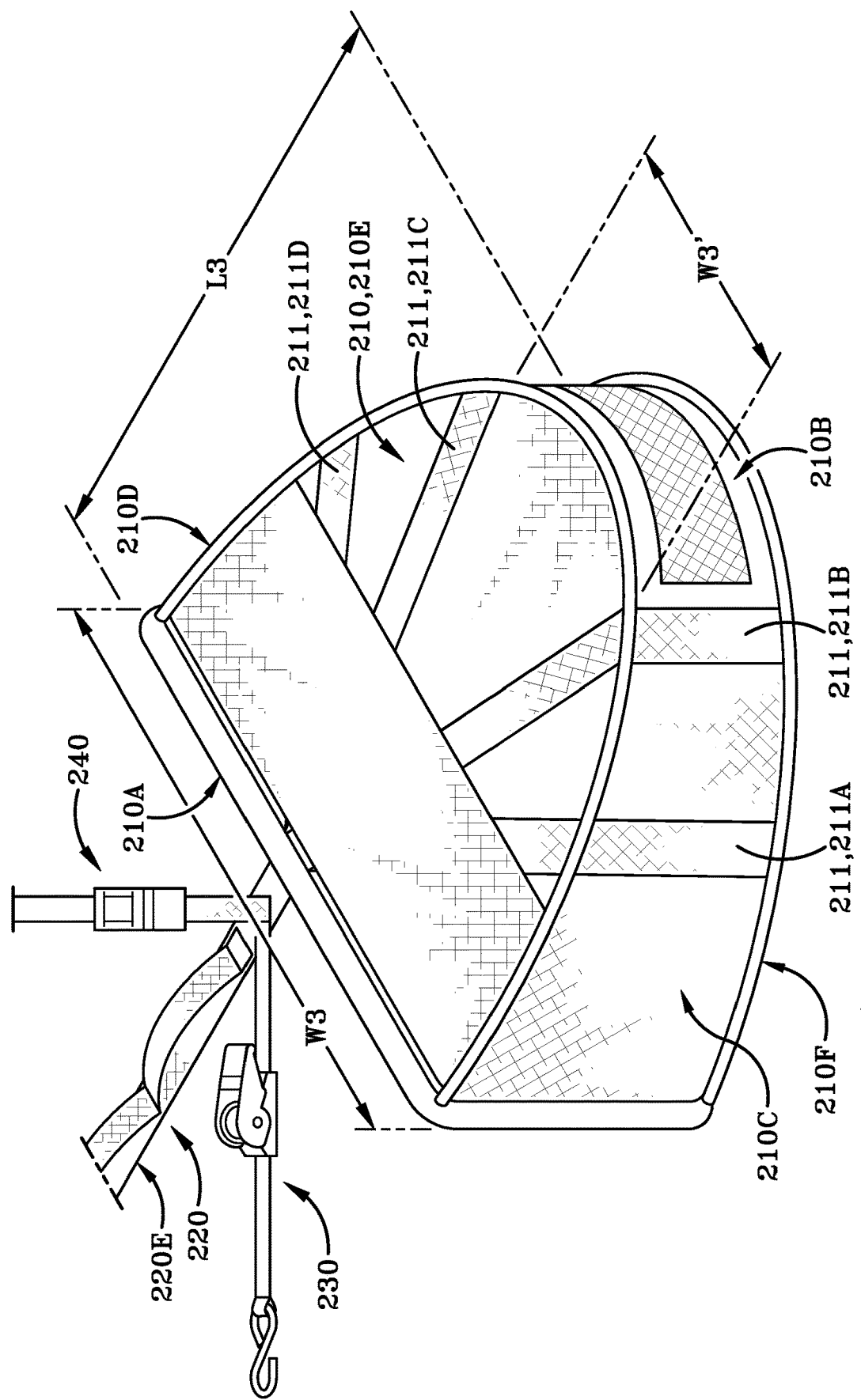
FIG. 6 is a top, rear, first side isometric perspective view of another cargo restraint apparatus in accordance with an aspect of the present disclosure.

FIG. 6 is another cargo restraint apparatus generally labeled as 200. The cargo restraint apparatus 200 is similar to the cargo restraint apparatus 1 illustrated in FIGS. 1-4 and as described above. Specifically, a hood 210, an attachment strap 220, a first anchoring assembly 230, a second anchoring assembly 240, and a draw-cord mechanism (not illustrated) are similar to the hood 10, attachment strap 20, first anchoring assembly 30, second anchoring assembly 40, and draw-cord mechanism 50 of the cargo restraint apparatus 1, except as detailed below.

Referring to FIG. 6, the hood 210 of the cargo restraint apparatus 100 is similar to the hood 10 of the cargo restraint apparatus 1. Specifically, the hood 210 includes a first or front end 210A, a second or rear end 210B, a first side 210C, a second side 210D, a third or top end 210E, and a fourth or bottom end 210F similar to the front end 10A, rear end 10B, first side 10C, second side 10D, top end 10E, and bottom end 10F of the cargo restraint apparatus 1 described above. The hood 210 also defines a third length "L3" measured from the front end 210A to the rear end 210B and a third width "W3" measured from the first side 210C to the second side 210D. In comparison to the cargo restraint apparatus 1 described above, the third width "W3" of the hood 210 progressively tapers from a first width "W3" to a second width "W3'" where the second width "W3'" is less than the first width "W3" of the hood 10. Such use of the cargo restraint apparatus 200 may be suitable for objects or materials with smaller widths and diameters as compared to the objects or materials described and illustrated with the hoods 10, 110 of the cargo restraint apparatus 1, 100. Additionally, each of the rear end 210B, the first side 210C, and the second side 210D defines a rounded and/or curvilinear edge where the rear end 210B, the first side 210C, and the second side 210D collectively define an elliptical-shape edge in comparison to the rear end 10B, the first side 10C, and the second side 10D of the hood 10 being linear and/or straight edges. Such use of the cargo restraint apparatus 200 may be suitable for objects or materials with rounded and/or curvilinear ends.

Still referring to FIG. 6, the hood 210 may also include a plurality of reinforcing members 211 that operably engages from a base member 220E of the attachment strap 220 to one of the rear end 210B, the first side 210C, and the second side 210D. Each reinforcing member of the plurality of reinforcing members 211 provides longitudinal strength and support to the hood 210 when objects are pressing against the hood 210 once the cargo restraint apparatus 200 secures and restrains the objects with a vehicle. The illustrated hood 210 includes a first reinforcing member 211A of the plurality of reinforcing members 211 that operably engages with the front end 210A of the hood 210 and at a position proximate to the first side 210C of the hood 210 between the front end 210A and the rear end 210B of the hood 210. The illustrated hood 210 also includes a second reinforcing member 211B of the plurality of reinforcing members 211 that operably engages with the front end 210A of the hood 210 and at a location proximate to the first side 210C of the hood 210 between the first reinforcing member 211A and the rear end 210B. The illustrated hood 210 also includes a third reinforcing member 211C of the plurality of reinforcing members 211 that operably engages with the front end 210A of the hood 210 and at a location proximate to the second side 210D of the hood 210 between the second reinforcing member 211B and the front end 210A. The illustrated hood 210 also includes a fourth reinforcing member 211D of the plurality of reinforcing members 211 that operably engages with the front end 210A of the hood 210 and at a location proximate to the second side 210D of the hood 210 between the third reinforcing member 211C and the front end 210A. In other exemplary embodiments, any suitable number of reinforcing members may be provided with a hood for providing longitudinal strength and support to the hood when objects are pressing against the hood once the cargo restraint apparatus secures and restrains the objects with a vehicle.

In any one of the cargo restraint apparatuses 1, 100, 100', 100", 200 described above, a light source or light indicator may be fixedly secured with the hood 10, 110, 110', 110", 210 to indicate to surrounding motorists and drivers that the vehicle is carrying an over-sized load. In one example, the light source may be powered by an on-board power source that is commercially available (e.g., a battery or other devices of the like). In another example, the light source may be powered by the vehicle through an electrical connection between the light source and the vehicle.

Figure 7:
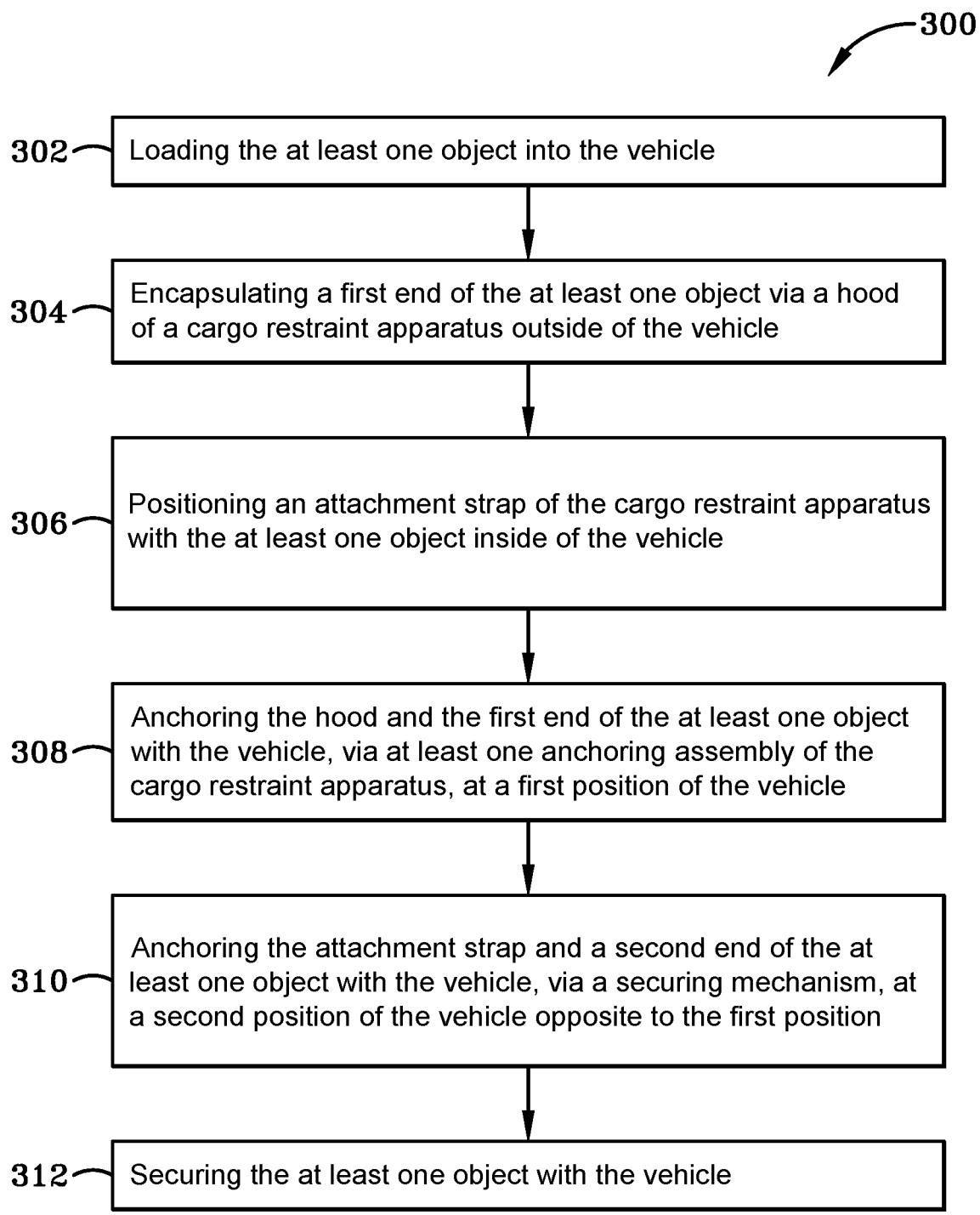
FIG. 7 is an exemplary method flowchart of securing at least one object with a vehicle.

FIG. 7 illustrates flowchart a method 300 of securing at least one object with a vehicle. An initial step 302 of method 300 comprises loading the at least one object into the vehicle. Another step 304 of method 300 comprises encapsulating a first end of the at least one object via a hood of a cargo restraint apparatus outside of the vehicle. Another step 306 of method 300 comprises positioning an attachment strap of the cargo restraint apparatus with the at least one object inside of the vehicle. Another step 308 of method 300 comprises anchoring the hood and the first end of the at least one object with the vehicle, via at least one anchoring assembly of the cargo restraint apparatus, at a first position of the vehicle. Another step 310 of method 300 comprises anchoring the attachment strap and a second end of the at least one object with the vehicle, via a securing mechanism, at a second position of the vehicle opposite to the first position. Another step 312 of method 300 comprises. securing the at least one object with the vehicle.

In other exemplary embodiments, method 300 may include optional step and/or additional steps of securing at least one object with a vehicle. An optional step may include selectively attaching the securing mechanism with the attachment strap at preconfigured attachment points discretely positioned between a first end of the attachment strap and a second end of the attachment strap. An optional step may include selectively attaching the securing mechanism with the attachment strap at at least one attachment point of a plurality of attachment points discretely positioned between a first end of the attachment strap and a second end of the attachment strap. Optional steps may include that wherein the step of anchoring the hood and the first end of the at least one object with the vehicle further includes: anchoring the hood and the first end of the at least one object with the vehicle, via a first anchoring assembly of the cargo restraint apparatus, at a first tie-down anchor of the vehicle at the first position of the vehicle; and anchoring the hood and the first end of the at least one object with the vehicle, via a second anchoring assembly of the cargo restraint apparatus, at a second tie-down anchor of the vehicle at the first position of the vehicle transversely opposite to the first tie-down. Optional steps may include that wherein the step of anchoring the attachment strap and the second end of the at least one object with the vehicle further includes that the securing mechanism operably engages with a third tie-down anchor of the vehicle longitudinally opposite to the first tie-down anchor for securing the attachment strap and the at least one object with the vehicle; and wherein the step of anchoring the attachment strap and the second end of the at least one object with the vehicle further includes that the securing mechanism operably engages with a fourth tie-down anchor of the vehicle longitudinally opposite to the second tie-down anchor for securing the attachment strap and the at least one object with the vehicle. An optional step may include cinching the hood with the at least one object via a draw-cord mechanism of the cargo restraint apparatus. An optional step may include storing the attachment strap, via a first pocket defined in the hood, when the cargo restraint apparatus is provided in a stored position. An optional step may include storing a draw-cord mechanism of the cargo restraint apparatus, via a second pocket defined in the hood, when the cargo restraint apparatus is provided in a stored position; wherein the second pocket opposes the first pocket and is separate from the first pocket.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A cargo restraint apparatus, comprising:
a hood having an open end, a closed end extending from the open end, and a chamber collectively defined between the open end and the closed end, wherein the hood is adapted to encapsulate and support an end of at least one object, via the chamber, outside of a vehicle;
an attachment strap operably connected with the hood and having a plurality of attachment points discretely positioned along a length of said attachment strap, wherein the attachment strap is adapted to restrain the at least one object inside of the vehicle upon engagement with a securing mechanism that is selectively operably engaged with one of the plurality of attachment points and with at least one tie down anchor of the vehicle; and
at least one anchoring assembly operably connected with one of the hood and the attachment strap, wherein the at least one anchoring assembly is adapted to secure the hood and the at least one object with the vehicle.

2. The cargo restraint apparatus of claim 1, wherein the hood is made from a flexible material that enables the hood to be foldable for storage purposes.

3. The cargo restraint apparatus of claim 1, wherein the hood is made from a flexible material that enables the hood to be rollable for storage purposes.

4. The cargo restraint apparatus of claim 1, further comprising:
a draw-cord mechanism operably engaged with the hood proximate to the open end of the hood;
wherein the draw-cord mechanism is configured to selectively set a diameter of the open end of the hood to access the chamber and to cinch the at least one object with the hood.

5. The cargo restraint apparatus of claim 4, further comprising
at least one pocket defined in the hood separate from the chamber;
wherein the at least one pocket is configured to house at least one of the attachment strap and the draw-cord mechanism when the cargo restraint apparatus is not being used.

6. The cargo restraint apparatus of claim 5, wherein the at least one pocket further comprises:
a first pocket defined in the hood that is separate from the chamber;
wherein the first pocket is configured to house the entire attachment strap when the cargo restraint apparatus is provided in a stored position.

7. The cargo restraint apparatus of claim 6, wherein the at least one pocket further comprises:
a second pocket defined in the hood that is separate from the chamber and the first pocket and is transversely opposite to the first pocket;
wherein the second pocket is configured to house the draw-cord mechanism when the cargo restraint apparatus is provided in the stored position.

8. The cargo restraint apparatus of claim 4, further comprising:
a passageway defined in the hood at the open end of said hood that is separate from the chamber;
wherein the passageway is configured to house the draw-cord mechanism and enable to the draw-cord mechanism and the hood to operably engaged with one another.

9. The cargo restraint apparatus of claim 4, further comprising:
at least one mesh component operably engaged with the hood at the closed end;
wherein the at least one mesh component is configured to enable air to flow through the hood and to prevent said air from being trapped inside of the hood.

10. The cargo restraint apparatus of claim 4, further comprising
a first pocket defined in the hood that is separate from the chamber and configured to house the entire attachment strap when the cargo restraint apparatus is provided in a stored position; and
a second pocket defined in the hood that is separate from the chamber and the first pocket and is transversely opposite to the first pocket;
wherein the second pocket is configured to house the draw-cord mechanism when the cargo restraint apparatus is provided in the stored position.

11. The cargo restraint apparatus of claim 1, wherein the at least one anchoring assembly further comprises:
a first anchoring assembly operably connected with one of the hood and the attachment strap; and
a second anchoring assembly operably connected with one of the hood and the attachment strap transversely opposite to the first anchoring assembly;
wherein the first anchoring assembly is configured to operably engage a first tie-down anchor of the vehicle to secure the hood and the at least one object with the vehicle; and
wherein the second anchoring assembly is configured to operably engage a second tie-down anchor of the vehicle transversely opposite to the first tie-down anchor to secure the hood and the at least one object with the vehicle.

12. The cargo restraint apparatus of claim 11, wherein when a securing mechanism operably engages with the attachment strap, the securing mechanism operably engages with a third tie-down anchor and a fourth tie-down anchor of the vehicle longitudinally opposite to the first tie-down anchor and the second tie-down anchor to secure the attachment strap and the at least one object with the vehicle.

13. The cargo restraint apparatus of claim 1, further comprising:
a safety indicator operably engaged at the closed end of the hood to alert surrounding traffic that the at least one object is protruding from the vehicle.

14. A method of securing at least one object with a vehicle, comprising steps of:
loading the at least one object into the vehicle;
encapsulating a first end of the at least one object via a hood of a cargo restraint apparatus outside of the vehicle;
positioning an attachment strap of the cargo restraint apparatus with the at least one object inside of the vehicle;
anchoring the hood and the first end of the at least one object with the vehicle, via at least one anchoring assembly of the cargo restraint apparatus, at a first position of the vehicle;
selectively attaching the securing mechanism with the attachment strap at preconfigured attachment points discretely positioned between a first end of the attachment strap and a second end of the attachment strap;
anchoring the attachment strap and a second end of the at least one object with the vehicle, via the securing mechanism, at a second position of the vehicle opposite to the first position; and
securing the at least one object with the vehicle.

15. A method of securing at least one object with a vehicle, comprising steps of:
loading the at least one object into the vehicle;
encapsulating a first end of the at least one object via a hood of a cargo restraint apparatus outside of the vehicle;
positioning an attachment strap of the cargo restraint apparatus with the at least one object inside of the vehicle;
anchoring the hood and the first end of the at least one object with the vehicle, via at least one anchoring assembly of the cargo restraint apparatus, at a first position of the vehicle;
anchoring the attachment strap and a second end of the at least one object with the vehicle, via a securing mechanism, at a second position of the vehicle opposite to the first position;
securing the at least one object with the vehicle;

storing the attachment strap, via a first pocket defined in the hood, when the cargo restraint apparatus is provided in a stored position; and storing a draw-cord mechanism of the cargo restraint apparatus, via a second pocket defined in the hood, when the cargo restraint apparatus is provided in a stored position;

wherein the second pocket opposes the first pocket and is separate from the first pocket.

16. The method of claim 14, wherein the step of anchoring the hood and the first end of the at least one object with the vehicle further includes:

anchoring the hood and the first end of the at least one object with the vehicle, via a first anchoring assembly of the cargo restraint apparatus, at a first tie-down anchor of the vehicle at the first position of the vehicle; and anchoring the hood and the first end of the at least one object with the vehicle, via a second anchoring assembly of the cargo restraint apparatus, at a second tie-down anchor of the vehicle at the first position of the vehicle transversely opposite to the first tie-down anchor.

17. The method of claim 16, wherein the step of anchoring the attachment strap and the second end of the at least one object with the vehicle further includes that the securing mechanism operably engages with a third tie-down anchor of the vehicle longitudinally opposite to the first tie-down anchor for securing the attachment strap and the at least one object with the vehicle; and wherein the step of anchoring the attachment strap and the second end of the at least one object with the vehicle further includes that the securing mechanism operably engages with a fourth tie-down anchor of the vehicle longitudinally opposite to the second tie-down anchor for securing the attachment strap and the at least one object with the vehicle.

18. The method of claim 14, further comprising:

cinching the hood with the at least one object via a draw-cord mechanism of the cargo restraint apparatus.

19. The method of claim 14, further comprising:

storing the attachment strap, via a first pocket defined in the hood, when the cargo restraint apparatus is provided in a stored position; and storing a draw-cord mechanism of the cargo restraint apparatus, via a second pocket defined in the hood, when the cargo restraint apparatus is provided in a stored position;

wherein the second pocket opposes the first pocket and is separate from the first pocket.

20. The method of claim 15, further comprising:

selectively attaching the securing mechanism with the attachment strap at at least one attachment point of a plurality of attachment points discretely positioned between a first end of the attachment strap and a second end of the attachment strap.

* * * * *